(12) United States Patent
Bennett

(10) Patent No.: US 6,961,898 B2
(45) Date of Patent: Nov. 1, 2005

(54) SYSTEM AND METHOD FOR CALCULATION USING VERTICAL PARENTHESES

(76) Inventor: Paul W. Bennett, 3700 Royal Port Rush Dr., Round Rock, TX (US) 78664

( * ) Notice: Subject to any disclaimer, the term of this patent is extended or adjusted under 35 U.S.C. 154(b) by 862 days.

(21) Appl. No.: 09/820,452

(22) Filed: Mar. 28, 2001

(65) Prior Publication Data

US 2002/0143810 A1 Oct. 3, 2002

(51) Int. Cl.[7] .................................................. G06F 15/00
(52) U.S. Cl. ......................................... 715/503; 715/504
(58) Field of Search ................................ 715/503, 504, 715/509

(56) References Cited

U.S. PATENT DOCUMENTS

| | | | | |
|---|---|---|---|---|
| 5,247,611 A | * | 9/1993 | Norden-Paul et al. ....... | 715/504 |
| 5,325,478 A | * | 6/1994 | Shelton et al. .............. | 715/507 |
| 5,381,353 A | * | 1/1995 | Oba ........................... | 708/168 |
| 5,418,902 A | * | 5/1995 | West et al. .................. | 715/503 |
| 5,471,575 A | * | 11/1995 | Giansante .................... | 715/503 |
| 5,598,519 A | * | 1/1997 | Narayanan ................... | 715/504 |
| 5,600,584 A | * | 2/1997 | Schlafly ...................... | 708/551 |
| 5,633,998 A | * | 5/1997 | Schlafly ........................ | 714/1 |
| 5,727,161 A | * | 3/1998 | Purcell, Jr. ..................... | 705/7 |
| 5,819,293 A | * | 10/1998 | Comer et al. ............... | 707/203 |
| 5,983,268 A | * | 11/1999 | Freivald et al. ............. | 709/218 |
| 6,138,130 A | * | 10/2000 | Adler et al. ................. | 715/503 |
| 6,199,078 B1 | * | 3/2001 | Brittan et al. ............... | 715/503 |
| 6,292,810 B1 | * | 9/2001 | Richards ....................... | 715/503 |
| 6,430,584 B1 | * | 8/2002 | Comer et al. ................ | 715/503 |
| 6,460,059 B1 | * | 10/2002 | Wisniewski .................. | 715/503 |
| 6,490,600 B1 | * | 12/2002 | McGarry ..................... | 715/503 |
| 6,690,401 B1 | * | 2/2004 | Stead .......................... | 345/784 |
| 6,701,485 B1 | * | 3/2004 | Igra et al. .................... | 715/503 |
| 2002/0023105 A1 | * | 2/2002 | Wisniewski ................. | 707/503 |
| 2002/0165875 A1 | * | 11/2002 | Verta ........................... | 707/503 |
| 2003/0056181 A1 | * | 3/2003 | Marathe ...................... | 715/538 |
| 2005/0066265 A1 | * | 3/2005 | Kotler et al. ................ | 715/503 |

OTHER PUBLICATIONS

Matthews, Excel for Windows 95 Made Easy, Fifth Edition, Lawrence Levitsky publisher, 1995, pp. 150–152, 185.*
Shaw et al., Microsoft Office 6 in 1, Que Corporation 1996, pp. 279, 291–297.*
Boyce et al., Using Microsoft Office 97, Que Corporation 1997, pp. 276–284, 375–382.*
Terry, Spreadsheets and the Credit Manager, Credit Control, Apr. 1992, vol. 13, Iss 4, p. 21, 4 pgs.*
Microsoft Excel 2000, Copyright 1995–1999 Microsoft Corporation, screenshots pp. 1–5.*

* cited by examiner

*Primary Examiner*—Cong-Lac Huynh
(74) *Attorney, Agent, or Firm*—Meyertons Hood Kivlin Kowert & Goetzel, P.C.; Jeffrey C. Hood

(57) ABSTRACT

Systems and methods for computer-based numerical calculation using a calcsheet are provided. A calcsheet may provide one or more columns for vertical calculation, each column having a plurality of fields including operation fields, number fields, and optional comment fields. The calcsheet may include multiple columns of vertical calculations. A user may type in calculations in a manner similar to the entry of calculations on a hand held calculator, and the calculations may be displayed in a vertical format in substantially any column. Number fields in a calcsheet may include mathematical formulas or references to other fields. A set of fields (such as all operation fields in a column, for example) may be hidden. The display order of fields may be altered. Parentheses spanning multiple rows may be used to alter the order of operations. Spreadsheet lines and vertical calculations may be used in a single document or display screen. Mathematical formulas may include a subtotal function which calculates a subtotal of the numeric values from preceding number fields.

30 Claims, 31 Drawing Sheets

|   | A | B | C | D | E | F | G | H |
|---|---|---|---|---|---|---|---|---|
| 1 |   | AMALGAMATED FRUIT INC. 1999 FISCAL DATA |   |   |   |   |   |   |
| 2 |   |   |   |   |   |   |   |   |
| 3 |   |   | 1Q | 2Q | 3Q | 4Q | 1999 |   |
| 4 |   | East | 11.00 | 12.00 | 13.00 | 14.00 | =C4+D4+E4+F4 |   |
| 5 |   | West | 16.00 | 15.00 | 18.00 | 19.00 | 67.00 |   |
| 6 |   | North | 9.00 | 12.00 | 7.00 | 11.00 | 39.00 |   |
| 7 |   | South | 13.00 | 15.00 | 14.00 | 18.00 | 60.00 |   |
| 8 |   | U.S. | 49.00 | 54.00 | 52.00 | 62.00 | 216.00 |   |
| 9 |   |   |   |   |   |   |   |   |

Fig. 3

| | A | | | B | | |
|---|---|---|---|---|---|---|
| Op | Number | Comment | Op | Number | Comment | Op |
| 1 | 660.00 | rent | | 20.00 | $ per hour | |
| 2 | + 400.00 | day care | * | 45.00 | hours per week | |
| 3 | + 300.00 | car payment | * | 4.30 | weeks per month | |
| 4 | + 40.00 | gasoline | = | 3,870.00 | $ per month (gross) | |
| 5 | + 100.00 | car insurance | * | 0.70 | take home % | |
| 6 | + 180.00 | medical insurance | = | 2,709.00 | net monthly income | |
| 7 | + 75.00 | electric | | | | |
| 8 | + 50.00 | phone | | 2,709.00 | net monthly income | |
| 9 | + 30.00 | cable TV | - | 2,435.00 | monthly expenses | |
| 10 | + 400.00 | food | = | 274.00 | total monthly savings | |
| 11 | + 100.00 | recreation | | | | |
| 12 | + 100.00 | miscellaneous | | | | |
| 13 | = 2,435.00 | monthly expenses | | | | |
| 14 | | | | | | |

Fig. 4

| | A | B | C | D | E |
|---|---|---|---|---|---|
| Op | Number | Op Number | Op Number | Op Number | Op Nu |
| 1 | 1.00 | 24.00 | 43.00 | 1.00 | |
| 2 | + 3.00 | * 5.00 | + 55.00 | / 3.00 | |
| 3 | + 3.00 | = 120.00 | + 21.00 | = 0.33 | |
| 4 | = 7.00 | | - 88.00 | | |
| 5 | | 99.00 | - 16.00 | 71.00 | |
| 6 | 19.00 | / 68.00 | + 5.00 | - 46.00 | |
| 7 | * 7.00 | = 1.46 | * 14.00 | - 12.00 | |
| 8 | - 331.00 | | = 280.00 | - 55.00 | |
| 9 | = -198.00 | | | = -42.00 | |
| 10 | | | | | |
| 11 | | | | | |

Fig. 5

| | A | | B | C | D | E | F |
|---|---|---|---|---|---|---|---|
| Op | Number | Comment | Number | Number | Number | Number | Number |
| 1 | | | | | | | |
| 2 | 1.00 | apple | 125.00 | 143.00 | 197.00 | 168.00 | |
| 3 | + 2.00 | oranges | 203.00 | 237.00 | 280.00 | 240.00 | |
| 4 | = 3.00 | fruits | 78.00 | 63.00 | 84.00 | 105.00 | |
| 5 | | | 219.00 | 236.00 | 225.00 | 204.00 | |
| 6 | | | | | | | |

Fig. 6

|   | A | | | B | | |
|---|---|---|---|---|---|---|
|   | Op | Number | Comment | Op | Number | Comment |
| 1 | | | CALCSHEET FOR CINDY'S MONTHLY BUDGET | | | |
| 2 | | | | | | |
| 3 | | | EXPENSES | | | INCOME |
| 4 | | 660.00 | rent | | 20.00 | $ per hour |
| 5 | + | 400.00 | day care | * | 45.00 | hours per week |
| 6 | + | 300.00 | car payment | * | 4.30 | weeks per month |
| 7 | + | 40.00 | gasoline | = | 3,870.00 | $ per month (gross) |
| 8 | + | 100.00 | car insurance | * | 0.70 | take home % |
| 9 | + | 180.00 | medical insurance | = | 2,709.00 | net monthly income |
| 10 | + | 75.00 | electric | | | |
| 11 | + | 50.00 | phone | | | |
| 12 | + | 30.00 | cable TV | | | SAVINGS |
| 13 | + | 400.00 | food | | 2,709.00 | net monthly income |
| 14 | + | 100.00 | recreation | | 2,435.00 | monthly expenses |
| 15 | + | 100.00 | miscellaneous | = | 274.00 | total monthly savings |
| 16 | = | 2,435.00 | monthly expenses | | | |
| 17 | | | | | | |

Fig. 7

|   | A | | B | | C | | D | |
|---|---|---|---|---|---|---|---|---|
|   | Op | Number | Op | Number | Op | Number | Op | Number |
| 1 | | | | | | | | |
| 2 | | 1.00 | | 4.00 | | 7.00 | | 10.00 |
| 3 | + | 2.00 | + | 5.00 | + | 8.00 | + | 11.00 |
| 4 | = | 3.00 | = | 9.00 | = | 15.00 | = | 21.00 |
| 5 | | | | | | | | |
| 6 | | | | | | | | |
| 7 | | 125.00 | | 143.00 | | 197.00 | | 168.00 |
| 8 | | 203.00 | | 237.00 | | 280.00 | | 240.00 |
| 9 | | 78.00 | | 63.00 | | 84.00 | | 105.00 |
| 10 | | 219.00 | | 236.00 | | 225.00 | | 204.00 |
| 11 | | | | | | | | |
| 12 | | | | | | | | |

| | Op | Number | Comment |
|---|---|---|---|
| 1 | | | CALCSHEET FOR CINE |
| 2 | | | |
| 3 | | | EXPENSES |
| 4 | | 660.00 | rent |
| 5 | + | 400.00 | day care |
| 6 | + | 300+40+100 | tcmobile |
| 7 | + | 180.00 | medical insurance |
| 8 | + | 75.00 | electric |
| 9 | + | 50.00 | phone |
| 10 | + | 30.00 | cable TV |
| 11 | + | 400.00 | food |
| 12 | + | 100.00 | recreation |
| 13 | + | 100.00 | miscellaneous |
| 14 | = | 2,435.00 | monthly expenses |
| 15 | | | |
| 16 | | | |

Fig. 9B

| | Op | Number | Comment |
|---|---|---|---|
| 1 | | | CALCSHEET FOR CINE |
| 2 | | | |
| 3 | | | EXPENSES |
| 4 | | 660.00 | rent |
| 5 | + | 400.00 | day care |
| 6 | + | 440.00 | automobile |
| 7 | + | 180.00 | medical insurance |
| 8 | + | 75.00 | electric |
| 9 | + | 50.00 | phone |
| 10 | + | 30.00 | cable TV |
| 11 | + | 400.00 | food |
| 12 | + | 100.00 | recreation |
| 13 | + | 100.00 | miscellaneous |
| 14 | = | 2,435.00 | monthly expenses |
| 15 | | | |
| 16 | | | |

Fig. 10

| | A Op | Number | B Comment | C Number | D Number | E Number | F Number | G Number | H Number |
|---|---|---|---|---|---|---|---|---|---|
| 1 | | | AMALGAMATED FRUIT INC. 1999 FISCAL DATA | | | | | | |
| 2 | | | | | | | | | |
| 3 | | | | 1Q | 2Q | 3Q | 4Q | 1999 | |
| 4 | | 1.00 | apple | East | 11.00 | 12.00 | 13.00 | 14.00 | C4+D4+E4+F4 |
| 5 | + | 2.00 | oranges | West | 16.00 | 15.00 | 18.00 | 19.00 | 68.00 |
| 6 | = | 3.00 | fruits | North | 9.00 | 12.00 | 7.00 | 11.00 | 39.00 |
| 7 | | | | South | 13.00 | 15.00 | 14.00 | 18.00 | 60.00 |
| 8 | | | | U.S. | 49.00 | 54.00 | 52.00 | 62.00 | 217.00 |
| 9 | | | | | | | | | |

| | A | | B | |
|---|---|---|---|---|
| | Comment | Number | Comment | Number |
| 1 | CALCSHEET FOR CINDY'S MONTHLY BUDGET | | | |
| 2 | | | | |
| 3 | EXPENSES | | INCOME | |
| 4 | rent | 660.00 | $ per hour | 20.00 |
| 5 | day care | 400.00 | hours per week | 45.00 |
| 6 | car payment | 300.00 | weeks per month | 4.30 |
| 7 | gasoline | 40.00 | $ per month (gross) | 3,870.00 |
| 8 | car insurance | 100.00 | take home % | 0.70 |
| 9 | medical insurance | 180.00 | net monthly income | 2,709.00 |
| 10 | electric | 75.00 | | |
| 11 | phone | 50.00 | | |
| 12 | cable TV | 30.00 | SAVINGS | |
| 13 | food | 400.00 | net monthly income | 2,709.00 |
| 14 | recreation | 100.00 | monthly expenses | 2,435.00 |
| 15 | miscellaneous | 100.00 | total monthly savings | 274.00 |
| 16 | monthly expenses | 2,435.00 | | |

Fig. 11

| | Op | Number | Comment | |
|---|---|---|---|---|
| 1 | | | | |
| 2 | | 1.00 | apple (a nice\|juicy red one) | |
| 3 | + | 2.00 | oranges | |
| 4 | = | 3.00 | fruits | |

Fig. 12A

| | Op | Number | Comment | Op | Number | |
|---|---|---|---|---|---|---|
| 1 | | | | | | |
| 2 | | 1.00 | apple (a nice | | 1.00 | bu |
| 3 | | | \|juicy red one) | + | 2.00 | do |
| 4 | + | 2.00 | oranges | = | 3.00 | me |
| 5 | = | 3.00 | fruits | | | |

Fig. 12B

|   | A |  |  | B |  |  |
|---|---|---|---|---|---|---|
|   | Op | Number | Comment | Op | Number | Comment |
| 1 |   |   |   |   |   |   |
| 2 |   | 1.00 | apple (a nice juicy red one) |   | 1.00 | burger |
| 3 | + | 2.00 | oranges | + | 2.00 | dogs |
| 4 | = | 3.00 | fruits | = | 3.00 | meats |
| 5 |   |   |   |   |   |   |

Fig. 13

|   | A |  |  | B |  |  |
|---|---|---|---|---|---|---|
|   | Op | Number | Comment | Op | Number | Comment |
| 1 |   | 3.00 |   |   | 3.00 |   |
| 2 | + | 4.00 |   | + | ( 4.00 |   |
| 3 | + | 5.00 |   | + | 5.00 |   |
| 4 | * | 6.00 |   | * | 6.00) |   |
| 5 | = | 72.00 |   | = | 57.00 |   |
| 6 |   |   |   |   |   |   |

Fig. 14

|   | A |  |  | B |  |  |
|---|---|---|---|---|---|---|
|   | Op | Number | Comment | Op | Number | Comment |
| 1 |   | 3.00 |   |   | 3.00 |   |
| 2 | * | 4.00 |   | * | ( 4.00 |   |
| 3 | + | 5.00 |   | + | 5.00 |   |
| 4 | * | 6.00 |   | * | 6.00) |   |
| 5 | = | 42.00 |   | = | 102.00 |   |
| 6 |   |   |   |   |   |   |

|  2  |   |  2.00  |
|-----|---|--------|
| Fig. 18A | | Fig. 18B |
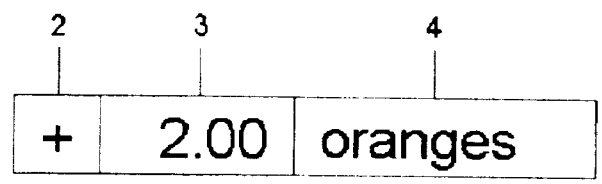
Fig. 19
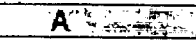
Fig. 20
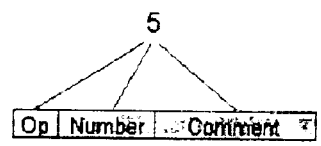
Fig. 21
Fig. 22

| | A | | | B | |
|---|---|---|---|---|---|
| Op | Number | Comment | Op | Number | Comment |
| | 1.00 | apple (a nice| | 1.00 | burger |
| + | 2.00 | oranges | + | 2.00 | dogs |
| = | 3.00 | fruits | = | 3.00 | meats |

Fig. 30B

| | A | | | B | |
|---|---|---|---|---|---|
| Op | Number | Comment | Op | Number | Comment |
| | 1.00 | apple (a nice juicy red one| | 1.00 | burger |
| | | | + | 2.00 | dogs |
| + | 2.00 | oranges | = | 3.00 | meats |
| = | 3.00 | fruits | | | |

Fig. 30C

| | A | | | B | |
|---|---|---|---|---|---|
| Op | Number | Comment | Op | Number | Comment |
| | 1.00 | apple (a nice juicy red one please) | 1.00 | burger |
| | | | + | 2.00 | dogs |
| | | | = | 3.00 | meats |
| + | 2.00 | oranges | | | |
| = | 3.00 | fruits | | | |

| | A | | | B | |
|---|---|---|---|---|---|
| | Op | Number | Comment | Op | Number | Comment |
| 1 | | CALCSHEET FOR CINDY'S MONTHLY BUDGET | | | | |
| 2 | | | | | | |
| 3 | | Expenses | | | Income | |
| 4 | | 660.00 | rent | | 20.00 | $ per hour |
| 5 | + | 400.00 | day care | * | 45.00 | hours per week |
| 6 | + | 300.00 | car payment | * | 4.30 | weeks per month |
| 7 | – | 40.00 | gasoline | = | 3,870.00 | $ per month (gross) |
| 8 | – | 100.00 | car insurance | * | 0.70 | take home % |
| 9 | – | 180.00 | medical insurance | = | 2,709.00 | net monthly income |
| 10 | + | 75.00 | electric | | | |
| 11 | + | 200.00 | phone | | | |
| 12 | + | 30.00 | cable TV | | Savings | |
| 13 | + | 400.00 | food | | 2,709.00 | net monthly income |
| 14 | + | 100.00 | recreation | – | 2,585.00 | monthly expenses |
| 15 | + | 100.00 | miscellaneous | = | 124.00 | *total monthly savings* |
| 16 | = | 2,585.00 | *monthly expenses* | | | |
| 17 | | | | | | |

Fig. 31

| | A | | |
|---|---|---|---|
| | Comment | Op | Number |
| 1 | CALCSHEET FOR CINDY'S | | |
| 2 | | | |
| 3 | Expenses | | |
| 4 | rent | | 660.00 |
| 5 | day care | + | 400.00 |
| 6 | car payment | + | 300.00 |
| 7 | gasoline | + | 40.00 |
| 8 | car insurance | + | 100.00 |
| 9 | medical insurance | + | 180.00 |
| 10 | electric | + | 75.00 |
| 11 | phone | + | 200.00 |
| 12 | cable TV | + | 30.00 |
| 13 | food | + | 400.00 |
| 14 | recreation | + | 100.00 |
| 15 | miscellaneous | + | 100.00 |
| 16 | monthly expenses | = | 2,585.00 |
| 17 | | | |

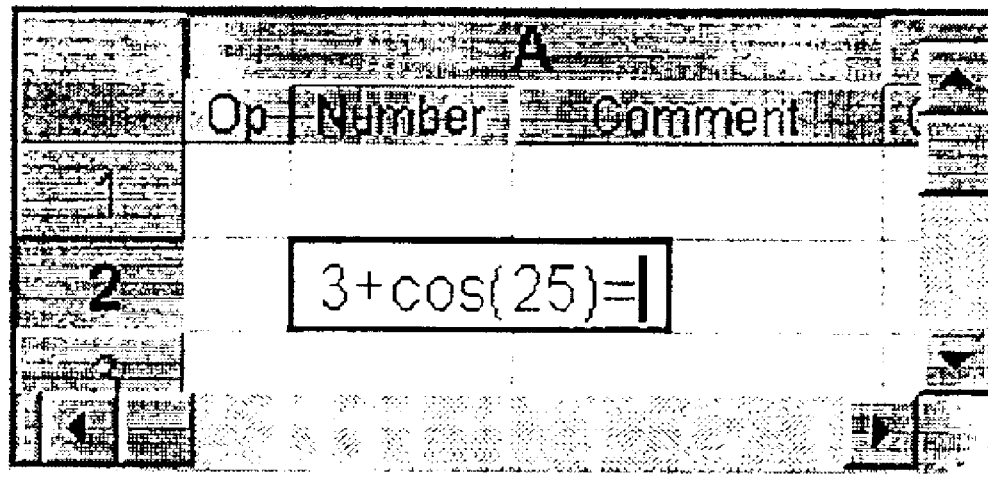
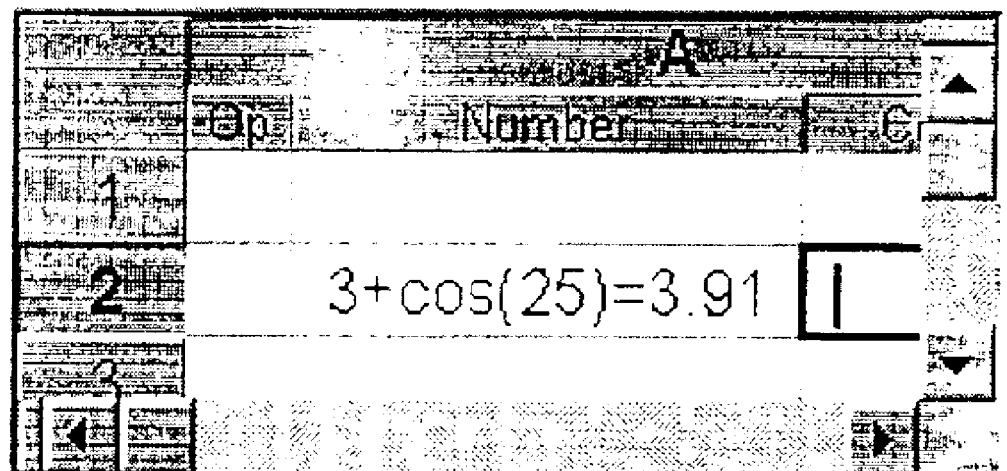
Fig. 45

SYSTEM AND METHOD FOR CALCULATION USING VERTICAL PARENTHESES

BACKGROUND OF THE INVENTION

1. Field of the Invention

This invention relates generally to computer systems and software. More particularly, the invention relates to computer-based calculation and spreadsheet systems and software.

2. Description of the Related Art

Generally, there are two types of computer programs for performing numerical calculations: spreadsheet programs and calculator programs. The advantages and disadvantages of both are discussed as follows.

Calculators

A calculator program includes a computer program that is used for performing numerical calculations. As used herein, the term "calculator program" includes a type of computer program that emulates the functionality of a hand-held calculator. Calculator programs often allow data to be entered via a computer keyboard in a very intuitive way, just as on a hand-held calculator. For example, entry of the key sequence "1+2+3=" would usually cause the calculator program to display the result "6". Calculator programs usually display a graphical image that looks like a hand held calculator which can be operated with a mouse to enter calculations instead of using a keyboard.

Many calculator programs display calculations on a display screen in a vertical format, similar to a tape produced by an adding machine. In these calculator programs, for example, entering the key sequence "1+2+3" would cause

1
+2
+3 to be displayed on the screen. For many people, this vertical sequence is a very intuitive way to display calculations because it is how they write arithmetic calculations on paper, and is how they have done so since early school days. In most calculator programs, the area of the screen that contains this vertical record of the keystrokes is called the "tape," and that term will be used when discussing calculator programs herein. (The term "tape" is derived from the paper tape of an adding machine). The term "vertical calculation" will be used to describe this format of displaying calculations vertically. Most calculator programs allow the tape to be printed out and also to be saved in a file.

Some calculator programs have tapes that can be modified. For example, the operators and the numbers may be changed, and the result may be recalculated using the modified values. FIG. 1 and FIG. 2 show examples of calculator programs with modifiable tapes. Some of these calculator programs with modifiable tapes also allow descriptive text comments to be placed next to the numbers on the tape. For example, the previous tape could be modified to look like:

1 apple
+2 oranges
+3 bananas

Despite the intuitive way that they allow calculations to be entered and displayed, calculator programs with modifiable tapes have been relatively unsuccessful commercially. The disadvantages of modifiable tapes of existing calculator programs are discussed as follows.

First, the tapes of the existing calculator programs can contain only very simple calculations that can be expressed in the adding machine tape format. It is impossible to enter repetitive data in a tabular, spreadsheet style format; it is impossible to display calculations horizontally; it is impossible to place function invocations in the tape, and it is impossible to enter calculations with parentheses.

Second, the tapes of the existing calculator programs only allow data to be entered in a single column. It is believed that not one commercially available calculator program has broken from the paradigm of the continuous single column paper tape of an adding machine. This format makes it very difficult to organize calculations in a logical way that is easy to view and modify on a computer screen, and this format makes it impossible to have tables of data.

Third, the tapes of the existing calculator programs are difficult to modify. The editing features of these programs are often cumbersome to use.

Fourth, the tapes of the existing calculator programs are not aesthetically pleasing. For example, calculations must all be placed in a single column. The calculator programs lack the ability to specify fonts, alignment, indentation, and other formatting characteristics of the data on the tapes. The calculator programs have very limited ability to allow descriptive text to be placed in the tape. This limited ability makes it impossible to use these programs to produce a professional looking business document; at best, they are limited to use as a "scratch pad" for numerical calculations.

Spreadsheets

Spreadsheets are computer programs that allow numbers, text data, and formulas to be stored in cells. The cells are displayed in rectangular areas on the screen and are arranged in a tabular format, i.e., in rows and columns. A single cell can contain a formula or function which may operate on multiple pieces of data stored in other cells. A cell's number, text data, or the result of the cell's formula or function is usually displayed in the cell that contains it.

FIG. 3 shows a typical modem spreadsheet program. The example of FIG. 3 shows data arranged as a table. The example table has cells with text, cells with numbers, and cells with formulas. Cells A1 and C3 are examples of cells that contain text data; the text in cell A1 spans several columns. Cells C4 through F4 contain numbers. Cell G4 contains a formula which adds the numbers in cells C4 through F4. FIG. 3 shows an example of what cell G4 may look like when it is being edited. When cell G4 is not being edited, it will display the result of the formula ("50.00").

Spreadsheet programs have been quite commercially successful: many millions of them have been sold since they were invented in the late 1970s. In fact, the vast majority of personal computers sold today come with a spreadsheet program pre-installed on them. Two examples of popular modem spreadsheets are "Lotus 1-2-3" (available from Lotus Development Corporation) and "Microsoft Excel" (available from Microsoft Corporation).

Despite the presence of a spreadsheet program on virtually every personal computer, there are relatively few people who actually use spreadsheets. Many people have seen spreadsheets and know what they are, but if they are asked to use a spreadsheet to perform some numerical calculations, they may be forced to admit that they don't know how. Spreadsheets are used almost exclusively as a business tool, and very few home computer users use spreadsheets at all. Home users very rarely perform the kind of numerical calculations on repetitive tabular data for which spreadsheets are best suited.

Even within most businesses, relatively few people use spreadsheets. "Using a spreadsheet" is defined here as creating a spreadsheet (e.g., entering formulas, functions and numbers) in order to record and/or calculate numerical values. After a spreadsheet has been created by an experienced user, it is often "used" by other employees who merely enter data into it. For purposes of this discussion, such simple data entry will not be considered to be using a spreadsheet since it is no different than entering data into any other program and does not require any knowledge of how to perform calculations with a spreadsheet. Generally, only professional employees such as managers, financial analysts, engineers, etc., who regularly need to work with repetitive numerical data know how to use a spreadsheet for anything other than data entry.

There are two primary reasons why relatively few people use spreadsheets. First, many types of calculations are awkward to represent as tables of data and/or as formulas in cells. Spreadsheets are not good tools for data that is not repetitive and tabular in nature. Home users in particular rarely need to work with such data. Second, spreadsheets are not easy to use. They are not for novice or unsophisticated computer users. They are powerful business tools; companies often need to provide formal training for employees to learn to use spreadsheets. Many spreadsheet users find the editing features in particular to be frustrating and unintuitive.

Both calculator programs and spreadsheets have advantages and disadvantages. Calculators are intuitive and easy to use yet have very limited functionality, and spreadsheets have a great deal of functionality but are very difficult to use. Therefore, it is desirable to provide an improved system and method for numerical calculation which combines the ease of use of a calculator program with the functionality of a spreadsheet program.

SUMMARY OF THE INVENTION

The systems and methods described herein may combine the intuitive data entry and display format of a calculator program with the powerful functionality of a spreadsheet, along with many additional features, to form a new classification of numerical processing programs which may be referred to as a calcsheet. The advantages of selected features of the calcsheet are described below.

Multiple Columns of Vertical Calculations

In one embodiment, the calcsheet may include multiple columns of vertical calculations. In one embodiment, a user may type in calculations in a manner similar to the entry of calculations on a hand held calculator, and the calculations may be displayed in a vertical format in substantially any column in the calcsheet. The ability to include vertical calculations as described above in potentially multiple columns provides significant advantages over both calculator programs and spreadsheets. A calcsheet may enable data to be arranged in a tabular format like a spreadsheet. This capability may open up a whole new class of calculations of which calculator programs are not capable. For example, much more information can be placed on a single screen. Many more calculations can be placed on the screen at the same time, allowing calculations to be accessed much more easily (e.g., without scrolling up and down) when they need to be changed or examined. Furthermore, it is possible to make calculations appear much more aesthetically pleasing, such that they are suitable for professional-quality business documents. In one embodiment of a calcsheet, data can be entered in the familiar hand-held calculator format and displayed in the familiar vertical calculation format, making the calcsheet useful for a whole class of calculations for which spreadsheets are too cumbersome. Vertical calculations may therefore make a calcsheet much easier to use than a spreadsheet for a large number of users.

Hiding Fields

In one embodiment, the calcsheet provides the ability to hide fields within a column. It is not believed that this function is available in any spreadsheets or in calculator programs. This function may provide several advantages over both calculator programs and spreadsheets. Field hiding further enhances the ability of a calcsheet to be used for both vertical calculations and tabular spreadsheet style computations. In one embodiment, vertical calculations can be converted to a tabular style display by hiding the operation and/or comment fields after the calculation has been entered. Similarly, tabular data can be converted to vertical calculations by "unhiding" the operation fields and entering operations in them. Field hiding may make the calcsheet easier to use by allowing more data to be placed on a single screen, thus requiring less scrolling than a calculator program. Field hiding may allow a calcsheet to be less visually confusing and more aesthetically pleasing by hiding unused or unwanted fields.

Spreadsheet Lines and Vertical Calculations in the Same Document

In one embodiment, a calcsheet may include a spreadsheet line: a kind of line that only has one field which spans the width of at least one column. In one embodiment, a spreadsheet line can include a comment, a number, or a formula. The ability to combine single-field spreadsheet lines with multi-field vertical calculation lines in a calcsheet may provide a significant advantage over calculator programs in at least two ways. First, the combination may allow a calcsheet to be much easier to read and understand and much more aesthetically pleasing by allowing comments to span multiple fields. This feature may also make it possible to produce a professional-looking business document with numerical data that is entered in the same familiar, intuitive way that it would be entered on a hand-held calculator. Second, the combination may allow the calcsheet to be used for both tabular repetitive data and vertical calculations. This feature is not believed to be found in any calculator program or spreadsheet. More specifically, the same column may contain vertical calculations as well as tabular spreadsheet data. This ability may allow a calcsheet to be arranged in a logical, easy to read, and aesthetically pleasing way.

Formulas in Number Fields

In one embodiment, calcsheets may include formulas in number fields. This ability may further enhance the utility of a calcsheet for both vertical calculations and tabular, spreadsheet-style computations. In one embodiment, vertical calculations may be simplified using formulas in number fields. Instead of the three lines for a set of related expenses, for example, a calcsheet may use a simple formula to combine all the expenses into only one line. In one embodiment, vertical calculations may be used for more complex calculations. The formulas in a number field may be arbitrarily complex arithmetic expressions with parentheses and advanced mathematical, trigonometric, statistical, and business functions. Therefore, it may be possible to use vertical calculations for very complex calculations that would either be very awkward or impossible to express with a calculator program.

Changing the Order of Fields

In one embodiment, a calcsheet may include the ability to change the order of fields within a column. For example, comment fields may be displayed on the left side of the number field, and operation fields may be hidden. This is a format that is often used in corporate financial statements: descriptive comment on the left and numbers on the right. Therefore, a calcsheet, unlike a spreadsheet or calculator program, may allow data to be entered in the intuitive calculator input format and displayed in a format that is suitable for professional quality business documents.

Parentheses in Vertical Calculations

In one embodiment, a calcsheet may include the ability to put parentheses in separate lines of a vertical calculation in order to modify the order of evaluation. It is not believed that this feature can be found in any calculator program or spreadsheet.

Calculator Input Mode

In one embodiment, a calcsheet may include a calculator input mode. In this mode, as the user enters calculations in hand-held calculator format, the calcsheet responds to each character as it is entered and automatically inserts new lines, switches input focus to the appropriate fields, places characters into the appropriate fields, and performs any other tasks needed to display the calculations vertically. This feature may provide a significant advantage over existing calculator programs which fail to provide a clear visual indicator of how the tape will be modified as calculations are entered. It is believed that existing calculator programs also do not allow new vertical calculations to be entered while editing previously entered data. Spreadsheets, of course, do not support vertical calculations (as described herein) at all.

Single Key Editing and Navigation

In one embodiment, a calcsheet may be easily modified (e.g., navigated and/or edited) using single keystrokes. One advantages of a calcsheet over spreadsheets and calculator programs is the ease with which a calcsheet may be modified. In one embodiment, when editing a field in a calcsheet, the user may switch to editing any adjacent field with a single keystroke using the arrow or tab keys. Therefore, the user may navigate anywhere in a calcsheet and edit any field using only the arrow keys, which usually are grouped together on a keyboard. Single-key editing and navigation may provide a significant usability advantage. In calculator programs, it is not believed to be possible to use the keyboard to switch editing to an adjacent field. Instead, the user must double click on the adjacent field with the mouse. Spreadsheets do allow the user to switch editing to an adjacent cell with the keyboard but instead require multiple keystrokes to do so, and typically with keys that are not grouped together on the keyboard.

Subtotal Function

In one embodiment, a calcsheet may use a subtotal function. A subtotal function may be entered into a number field and may return a subtotal of one or more numeric values in number fields preceding the number field in which the subtotal function was entered. In one embodiment, the subtotal function will apply the appropriate mathematical operators to the numeric values in all the number fields above that of the subtotal function. If, however, the subtotal function follows an open parenthesis character (e.g., an open parenthesis character appears on a line preceding the line with the subtotal function), then the function will return the subtotal starting from the line containing the previous open parenthesis character. In other words, vertical parentheses may be used to select a subset of the preceding number fields to sum. In one embodiment, the subtotal function may be part of a larger mathematical formula. In other words, the subtotal function may be evaluated, and then the resulting value may be used in another formula.

BRIEF DESCRIPTION OF THE DRAWINGS

The objects and advantages of the invention will become apparent upon reading the following detailed description and upon reference to the accompanying drawings in which:

FIG. 3 shows a typical modem spreadsheet program.

FIG. 4 shows a basic calcsheet that has multiple columns of vertical calculations according to one embodiment.

FIG. 5 shows a calcsheet that has columns with comment fields hidden according to one embodiment.

FIG. 6 shows a calcsheet with columns that have their operation and comment fields hidden according to one embodiment.

FIG. 7 shows a calcsheet with spreadsheet lines containing descriptive text according to one embodiment.

FIG. 8 shows a calcsheet with vertical calculation lines and spreadsheet lines containing numerical values according to one embodiment.

FIGS. 9A and 9B show a calcsheet with a formula in a number field (line A6), as the number field is being edited (9A), and when the number field is not being edited (9B), according to one embodiment.

FIG. 10 shows a calcsheet with formulas in number fields according to one embodiment.

FIG. 11 shows a calcsheet with comments displayed on the left of the column, and with operation fields hidden, according to one embodiment.

FIG. 12A shows a calcsheet before the comment field in line A3 is split, and FIG. 12B shows the calcsheet after the split command, according to one embodiment.

FIG. 13 shows a multi line comment field in a single-row line according to one embodiment.

FIG. 14 shows a vertical calculation evaluated in sequential order in column A, and a vertical calculation evaluated in sequential-parenthetical order in column B, according to one embodiment.

FIG. 15 shows a vertical calculation evaluated in algebraic order in column A, and a vertical calculation evaluated in algebraic-parenthetical order in column B, according to one embodiment.

FIGS. 16A through 16G show a calculator input mode screen sequence when the characters "1 apple+2=" are entered according to one embodiment.

FIGS. 17A and 17B show a switch from editing the number field (17A) to editing the comment field (17B) which is accomplished with a single keystroke according to one embodiment.

FIG. 18A shows a number field with its character string displayed in it, and FIG. 18B shows the same field with its output character string displayed in it, according to one embodiment.

FIG. 19 shows a calc line with an operation field, a number field, and a comment field according to one embodiment.

FIG. 20 shows a column header displayed over a column of 9 calc lines according to one embodiment.

FIG. 21 shows 3 field headers displayed over the fields of a column of 7 calc lines that each have 3 fields according to one embodiment.

FIG. 22 shows a row header displayed next to a row of 2 calc lines, each with three fields, according to one embodiment.

FIG. 23 shows a calcsheet with 3 columns and 14 rows visible, and with a vertical calculation in lines A2, A3 and A4, according to one embodiment.

FIG. 24A shows a single character string (edit string) for all fields in a line when the line has the focus, and FIG. 24B shows substrings of the edit string displayed in the individual fields when the line does not have the focus, according to one embodiment.

FIG. 25 shows a calcsheet with comments fields displayed on the left and with display of operation field strings suppressed when the operation fields do not have the focus, according to one embodiment.

FIGS. 26A and 26B show suppression of display of total operation field strings when the operation fields do not have the focus, while FIGS. 26C and 26D show that the display of other (non-total) operation field strings is not suppressed, according to one embodiment.

Figures 29A, 29B, 29C, 29D, 29E:
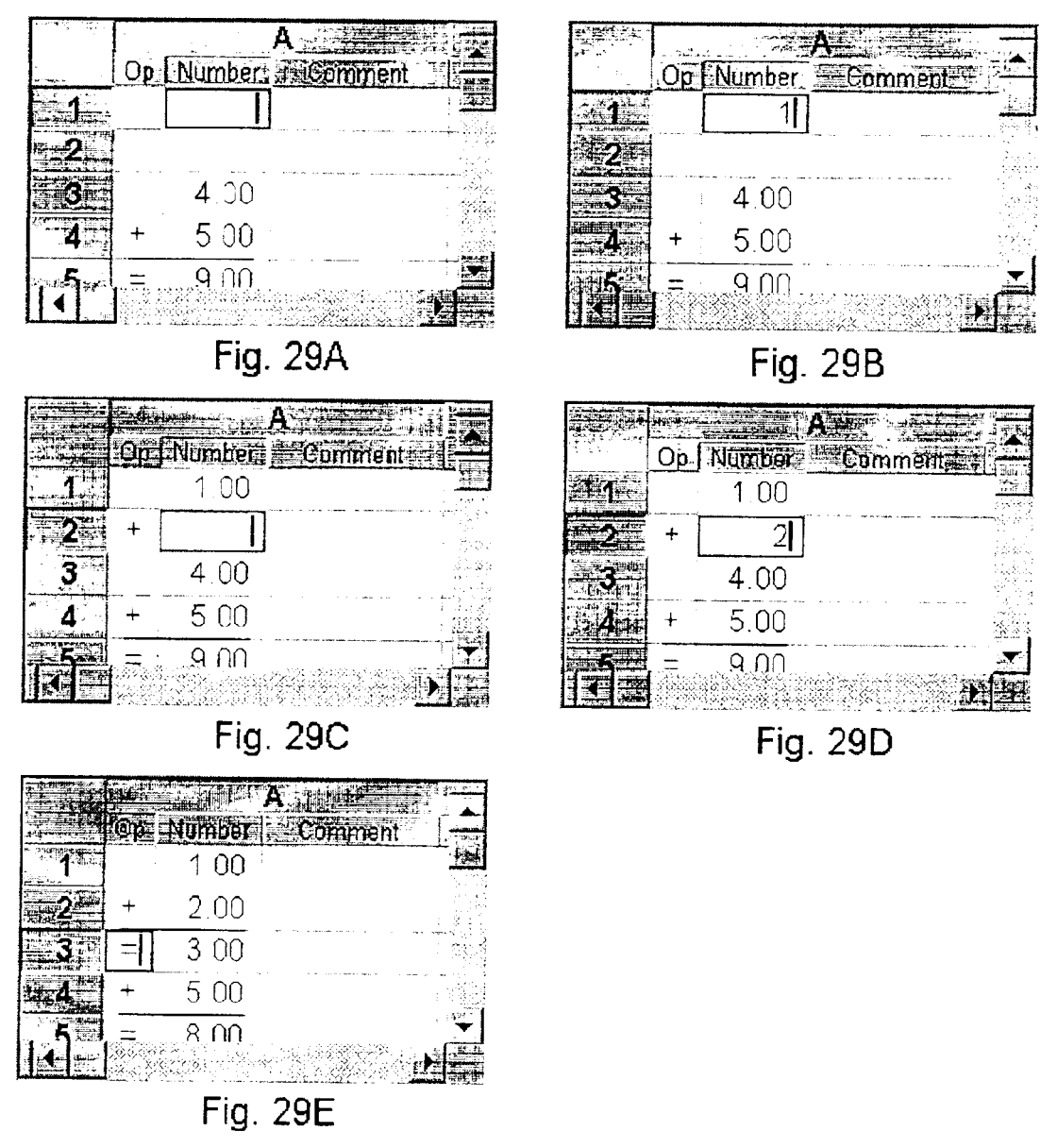

FIGS. 29A through 29E show a screen sequence demonstrating calculator input "overlay mode" when the characters "1+2=" are typed in according to one embodiment.

FIGS. 30A though 30C show a single-row line (line A2) expanding into a multi-row line as its comment field requires more lines to display, according to one embodiment.

FIG. 31 shows calc line fields with different fonts and formatting according to one embodiment.

FIG. 32 shows comment fields with right alignment according to one embodiment.

FIG. 33A shows a function in the number field of line A3, FIG. 33B shows the numeric value of the function displayed in the number field of line A3 when it does not have the focus, FIG. 33C shows the source string displayed in the number field of line A3 when it does not have the focus, and FIG. 33D shows a single quote in line A3's number field string to indicate that the source string should be displayed when the field does not have the focus, according to one embodiment.

FIG. 34 shows a number field, line A6, with a formula source string displayed when it does not have the focus according to one embodiment.

FIG. 35A shows an equals line displayed with a total calc line, and FIG. 35B shows that the equals line is erased when the operation is changed to a non-total operation, according to one embodiment.

FIG. 36 shows that an equals line's thickness is proportional to the font according to one embodiment.

FIG. 37 shows an equals line displayed in the calc line before the total calc line according to one embodiment.

FIG. 38 shows a calc line that is made taller because it has a total operation according to one embodiment.

FIGS. 39A and 39B show that a reference to another calc line may cause the comment of the referenced calc line to be displayed in the referencing line's comment field if the referencing line's comment field string is null according to one embodiment.

FIGS. 39C and 39D show that a reference to another calc line will not cause the comment of the referenced calc line to be displayed in the referencing line's comment field if the referencing line's comment field string is not null according to one embodiment.

FIGS. 40A and 40B show that a parenthesis in the character string of a number field may be displayed along with the number field's output string when the number field does not have the focus according to one embodiment.

FIG. 41 shows basic adding machine order of evaluation in column A and two possible variations of adding machine order of evaluation with multiplication operations in columns B and C according to one embodiment.

FIG. 42 shows regular sequential order of evaluation in column A and sequential order of evaluation with the operation in the calc line of the first operand according to one embodiment.

FIG. 45 illustrates an example of a horizontal calculation according to one embodiment.

Figure 1:
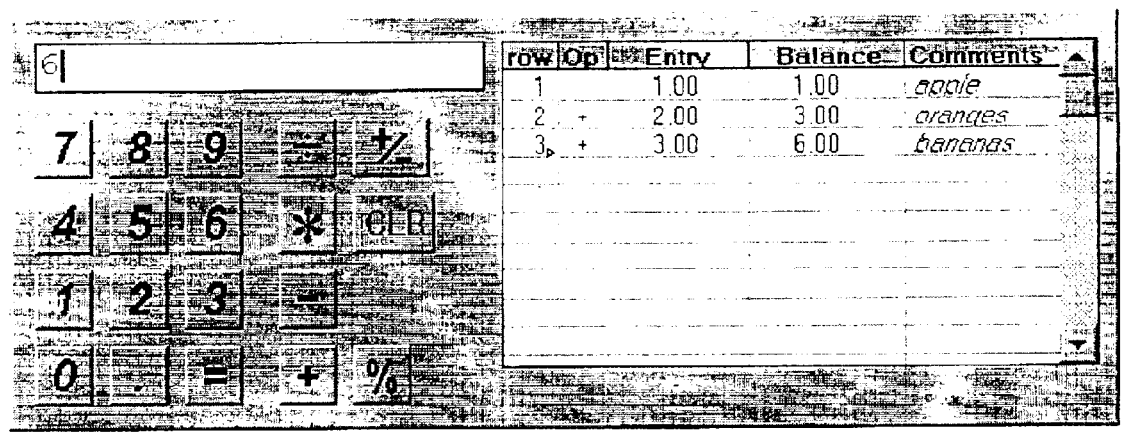
FIG. 1 shows an example of a calculator program with a modifiable tape.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 43:
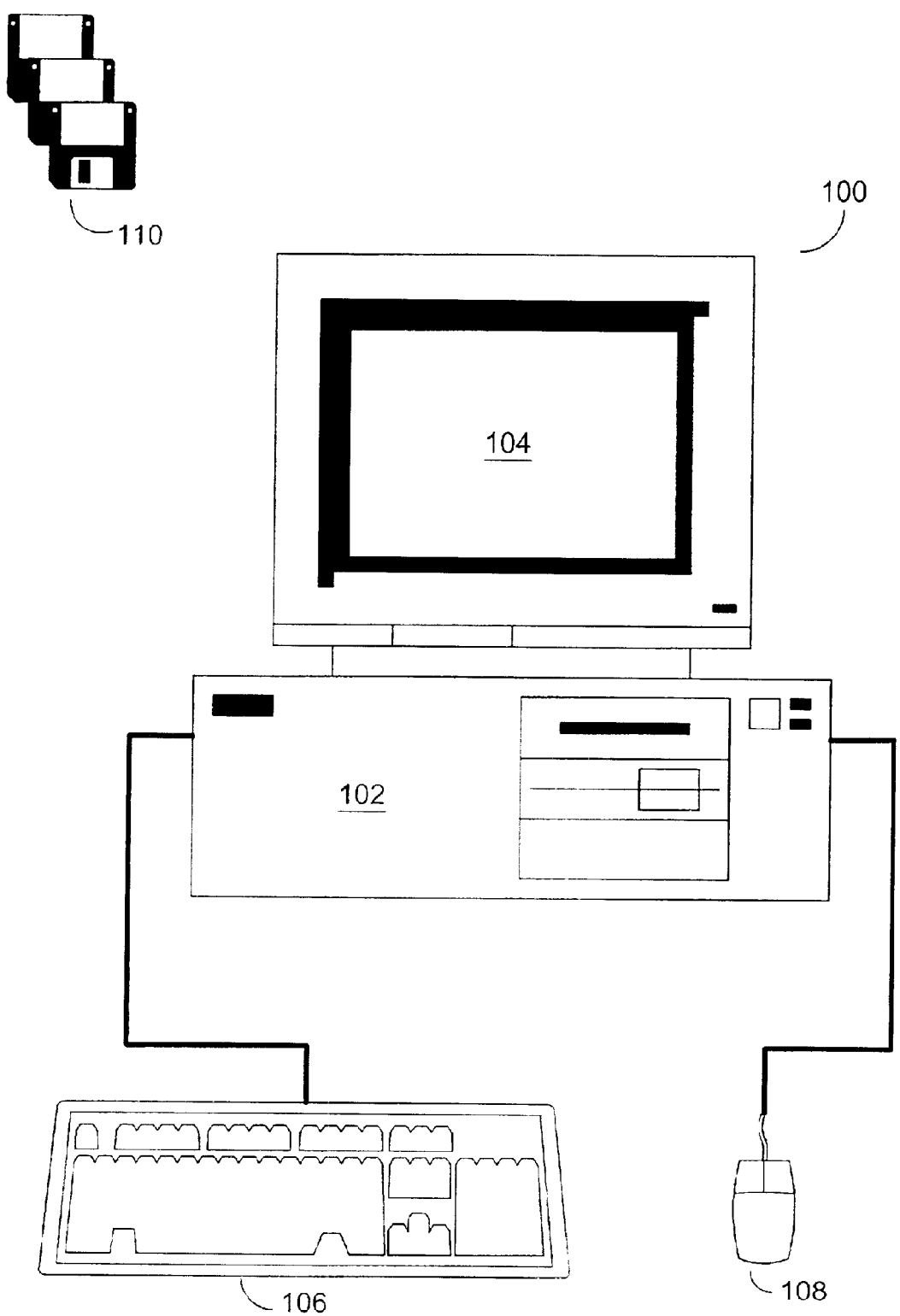
FIGS. 43 and 44 illustrate a typical computer system with computer software programs which is suitable for implementing various embodiments.

FIG. 43—A Typical Computer System

FIG. 43 illustrates a typical, general-purpose computer system 100 which is suitable for implementing numerical calculation systems and methods according to various embodiments. The computer system 100 typically comprises components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. In various embodiments, the computer system 100 may comprise a desktop computer, a laptop computer, a palmtop computer, a network computer, a personal digital assistant (PDA), an embedded device, a smart phone, or any other suitable computing device.

Figure 44:
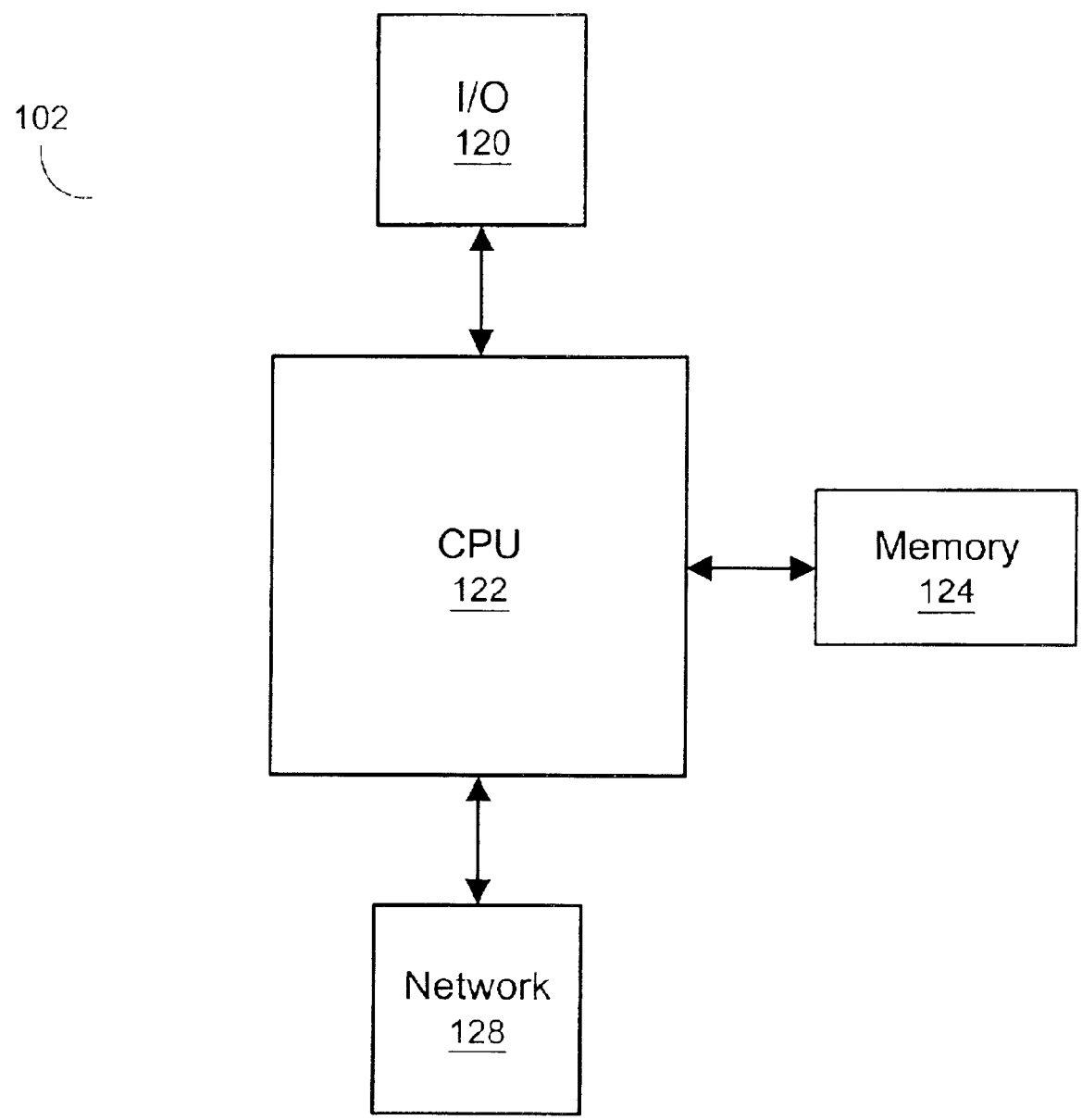

FIG. 44—Computing Hardware of a Typical Computer System

FIG. 44 is a block diagram illustrating the computing hardware 102 of a typical, general-purpose computer system 100 which is suitable for implementing numerical calculation systems and methods according to one embodiment. The computing hardware 102 includes at least one central processing unit (CPU) or other processor(s) 122. The CPU 122 is configured to execute program instructions which implement the numerical calculation systems and methods as described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which are executable by the CPU 122 to perform and/or implement the numerical calculation systems and methods as described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the numerical calculation systems and methods as described herein through the input/output bus 120.

The CPU 122 may include a network interface device 128 for coupling to a network. The network may be representative of various types of possible networks: for example, a local area network (LAN), wide area network (WAN), or the Internet. The improved management console as described herein may therefore be implemented on a plurality of heterogeneous or homogeneous networked computer systems such as computer system 100 through one or more networks. Each computer system 100 may acquire program instructions and/or data for implementing the numerical calculation systems and methods as described herein over the network.

Terminology

Figures 23, 24A, 24B:
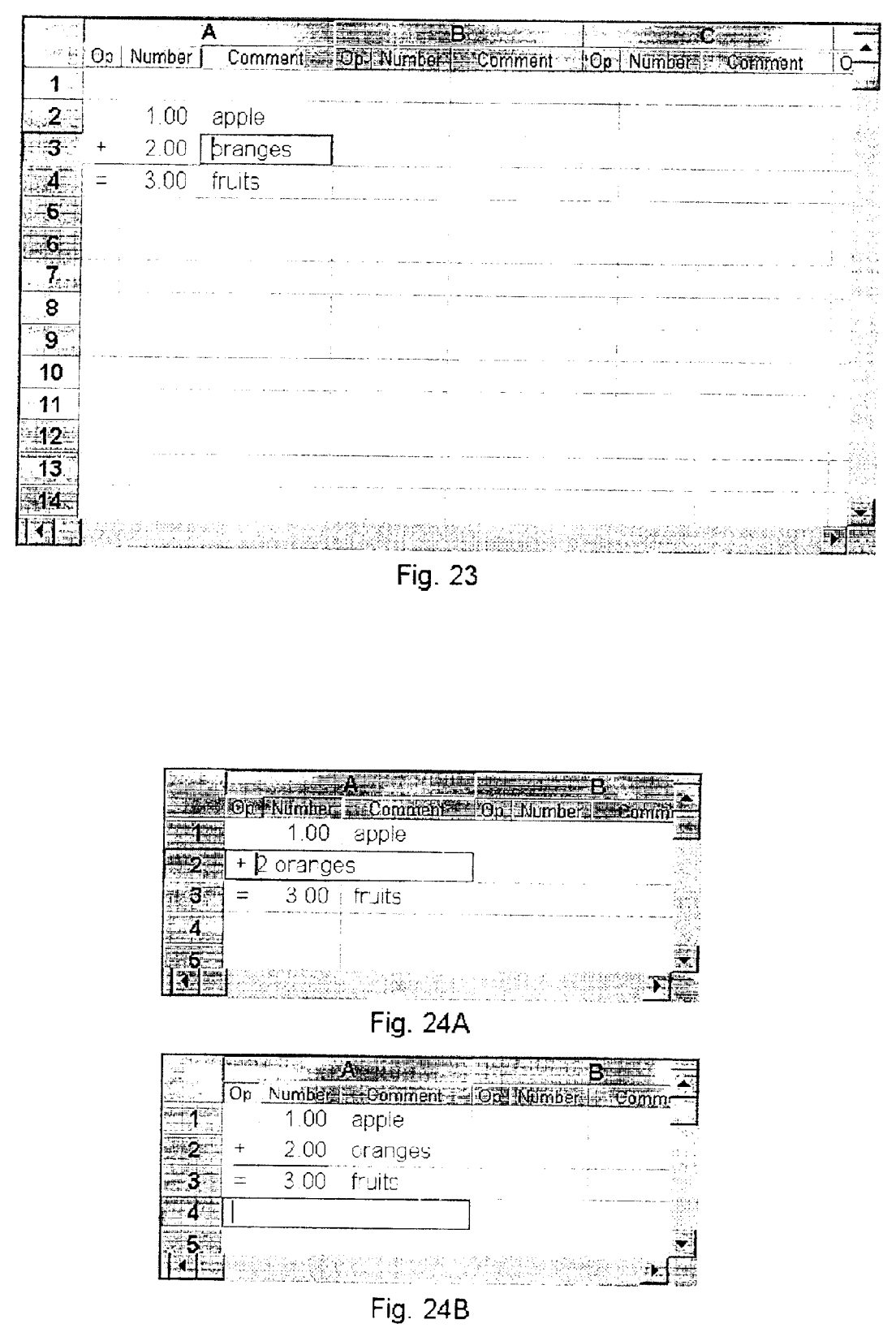

The following terminology will be used to describe the systems and methods described herein. A "field" includes a rectangular area of screen that can contain a character string. An "operation field" includes a field that can contain an arithmetic operation such as +,−, *, /, =, etc. A "number field" includes a field that can contain a number, formula, or function. A "comment field" includes a field that can contain a descriptive comment. A "line" includes a group of one or more fields arranged contiguously side by side on the screen. In one embodiment, a line is the smallest unit that can be added to (e.g., inserted into) or removed from (e.g., deleted from) a calcsheet. A "calc line" includes a line with an operation field, a number field and, optionally, a comment field. FIG. 19 shows an example of a typical calc line according to one embodiment. A "calcsheet" includes a matrix of lines arranged in rows and columns. A "calculation," also referred to as a "vertical calculation," includes a series of calc lines in a column, where the lines include operations and numbers that define an arithmetic calculation. FIG. 23 shows an example of a typical calcsheet according to one embodiment. The calcsheet in FIG. 23 includes an example of a calculation including 3 lines (A2, A3 and A4).

Figures 17A, 17B:
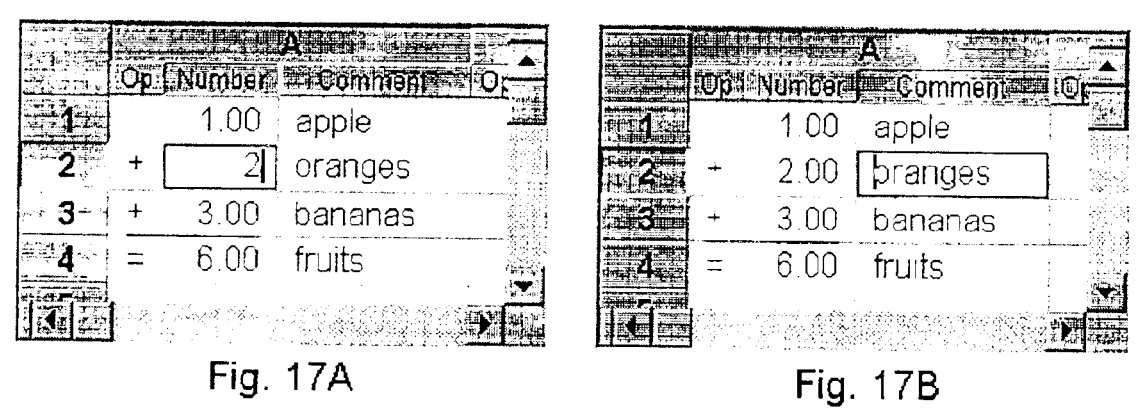

The field that is currently being modified is said to have the "focus." The field that has the focus may be indicated visually by a black box around the field. The place where character input will be placed in the focus field's string may be indicated visually by a blinking vertical line. FIG. 17A shows an example of a calcsheet with the focus on line A2's number field. FIG. 17B shows an example of a calcsheet with the focus on line A2's comment field.

The systems and methods described herein may combine the intuitive data entry and display format of a calculator program with the powerful functionality of a spreadsheet, along with many additional features, to form a new classification of numerical processing programs which may be referred to as a calcsheet. Several advantages of the calcsheet are discussed as follows.

Multiple Columns of Vertical Calculations

FIG. 4 shows an example of a basic calcsheet screen according to one embodiment. The example calcsheet of FIG. 4 includes multiple columns, where two of the columns include vertical calculations. In one embodiment, a user may type in calculations in a manner similar to the entry of calculations on a hand held calculator, and the calculations may be displayed in a vertical format in substantially any column in the calcsheet.

It is not believed that any calculator program has ever broken from the single column adding machine tape paradigm, and it is not believed that any spreadsheet has ever incorporated the ability to process vertical calculations. The ability to include vertical calculations as described above in potentially multiple columns may therefore provide significant advantages over both calculator programs and spreadsheets.

A calcsheet may enable data to be arranged in a tabular format like a spreadsheet. This capability may open up a new class of calculations of which calculator programs are not capable. For example, much more information can be placed on a single screen. Many more calculations can be placed on the screen at the same time, allowing calculations to be accessed much more easily (e.g., without scrolling up and down) when they need to be changed or examined. Furthermore, it is possible to make calculations appear much more aesthetically pleasing, such that they are suitable for professional-quality business documents.

In one embodiment of a calcsheet, data can be entered in the familiar hand-held calculator format and displayed in the familiar vertical calculation format, making the calcsheet useful for a whole class of calculations for which spreadsheets are too cumbersome. Vertical calculations may therefore make a calcsheet much easier to use than a spreadsheet for a large number of users.

Figure 46:
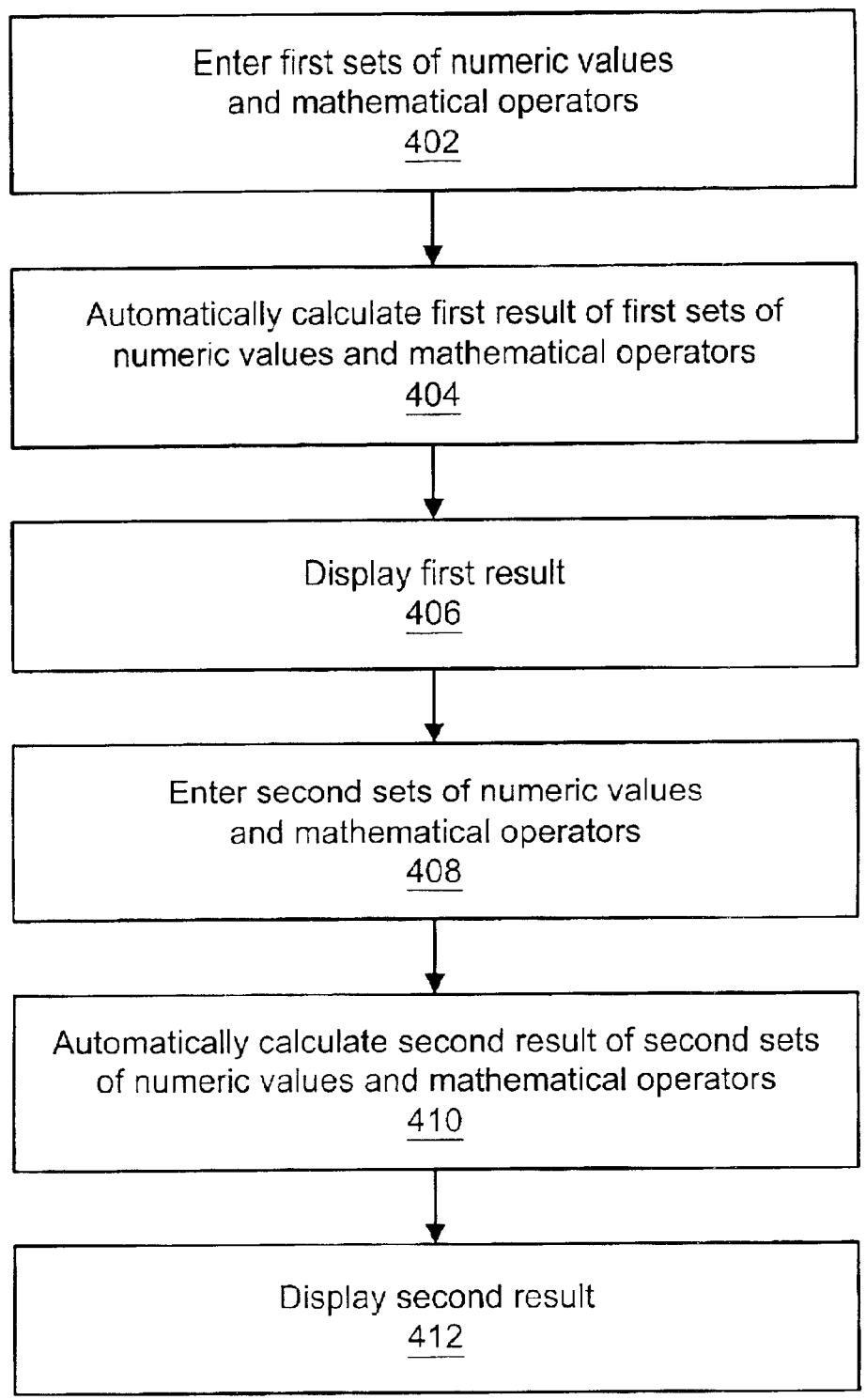
FIG. 46 is a flowchart illustrating a method of using multiple columns of vertical calculations according to one embodiment.

FIG. 46 is a flowchart illustrating a method of using multiple columns of vertical calculations according to one embodiment. In this example, two columns are used for purposes of illustration, but an arbitrary number of columns (from one to n, where n is a maximum number that system resources will permit) may be used in one embodiment. In 402, a first set of numeric values may be entered in a first plurality of number fields, wherein the first plurality of number fields are displayed in columnar format on a display screen. Additionally, a first set of one or more mathematical operators may be entered in a first set of one or more operation fields, wherein the first set of operation fields are displayed in columnar format on the display screen. Note that in various embodiments, the numeric values and mathematical operators may be entered in various orders (e.g., a numeric value, a mathematical operator, another numeric value, another mathematical operator, etc.). In 404, a first result may be automatically calculated by applying the first set of mathematical operators to the first set of numeric values. In 406, the first result may be displayed on the display screen. In one embodiment, the first result may be displayed below the first set of number fields.

The vertical calculation may use only one column. However, additional columns may be used for vertical calculations in one embodiment. In 408, a second set of numeric values may be entered in a second plurality of number fields, wherein the second plurality of number fields are displayed in columnar format on the display screen in a different column than the first set of numeric values. A second set of one or more mathematical operators may be entered in a second set of one or more operation fields, wherein the second set of operation fields are displayed in columnar format on the display screen in a different column than the first set of mathematical operators. Again, note that in various embodiments, the numeric values and mathematical operators may be entered in various orders (e.g., a numeric value, a mathematical operator, another numeric value, another mathematical operator, etc.). In 410, a second result may be automatically calculated by applying the second set of mathematical operators to the second set of numeric values. In 412, the second result may be displayed on the display screen. In one embodiment, the second result may be displayed below the second set of number fields.

In one embodiment, 402 through 406 may be performed substantially simultaneously with 408 through 412. In other words, the user may enter and/or edit a first vertical calculation at substantially the same time as a second vertical calculation. In one embodiment, the results may be dynamically and automatically recalculated as the numeric values and mathematical operators are edited.

Hiding Fields

In one embodiment, the calcsheet provides the ability to hide fields within a column. It is not believed that this function is available in any spreadsheets or in calculator programs. This function may provide several advantages over both calculator programs and spreadsheets. Field hiding further enhances the ability of a calcsheet to be used for both vertical calculations and tabular spreadsheet style computations. In FIG. 6, columns B, C, D, E and F have only the number fields displayed: the operation and comment fields have been hidden. Therefore, those columns have the approximate appearance and function of a spreadsheet. In contrast, column A includes a vertical calculation, and all three of its fields are shown. In one embodiment, vertical calculations can be converted to a tabular style display by hiding the operation and/or comment fields after the calculation has been entered. Similarly, tabular data can be converted to vertical calculations by "unhiding" the operation fields and entering operations in them.

Field hiding may make the calcsheet easier to use by allowing more data to be placed on a single screen, thus requiring less scrolling than a calculator program. For example, hiding the comment fields in the calcsheet in FIG. 5 allows twice as many calculations to be displayed on a screen. Field hiding may allow a calcsheet to be less visually confusing and more aesthetically pleasing by hiding unused or unwanted fields. For example, hiding operation fields can give a calcsheet a clean look, as demonstrated in FIG. 11.

Figure 51:
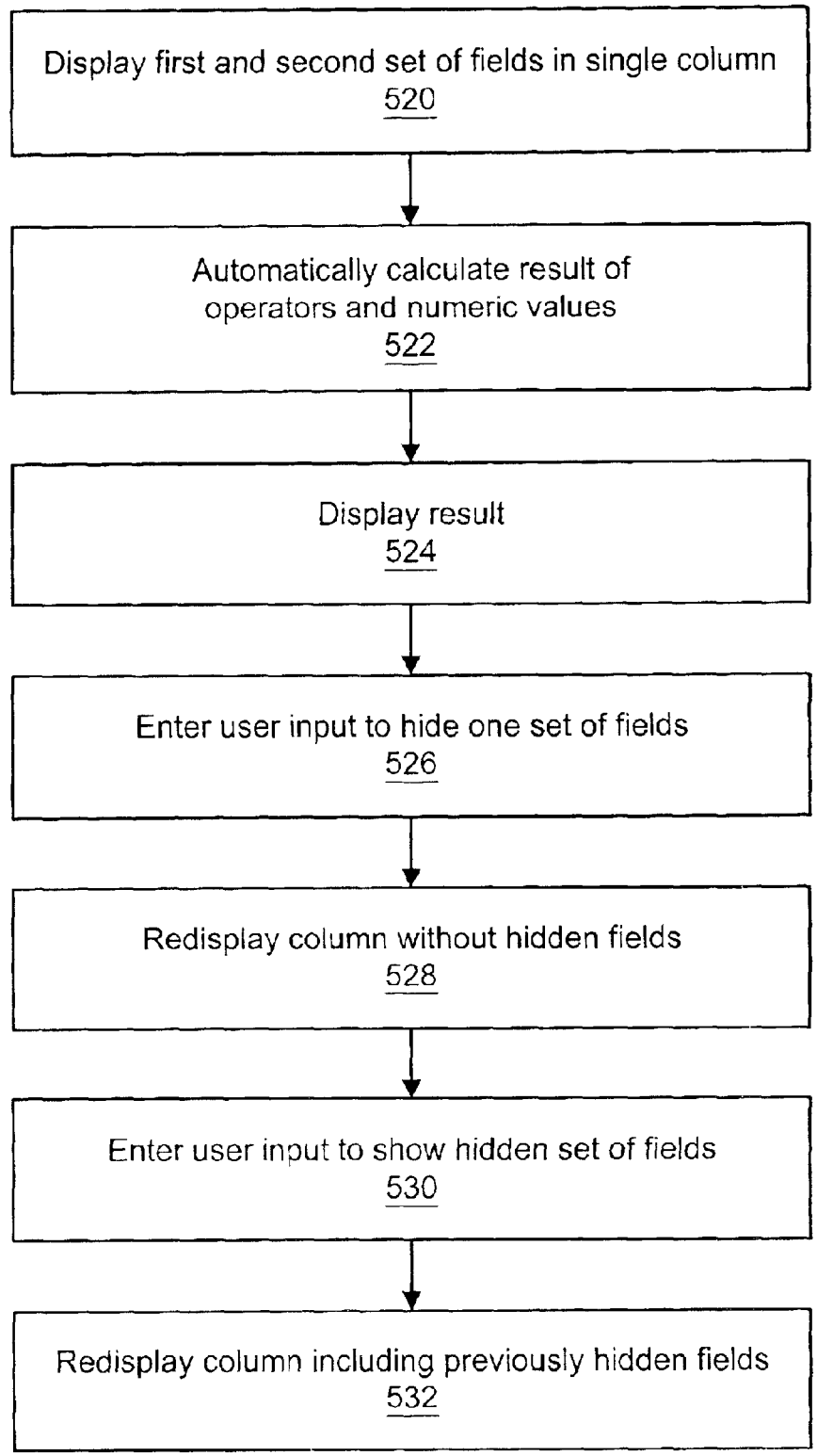
FIG. 51 is a flowchart illustrating a method of using multi-field columns with fields that can be hidden according to one embodiment.

FIG. 51 is a flowchart illustrating the use of multi-field columns with fields that may be hidden according to one embodiment. In 520, a plurality of rows and at least one column may be displayed in a matrix on a display screen, wherein the at least one column comprises a first set of fields and a second set of fields. The first set of fields and the second set of fields may include one or more mathematical operators and one or more numeric values. Each set of fields may be displayed in columnar format down the plurality of rows in the at least one column, and the at least one column may include a single column label which spans the width of one of the first set of fields and one of the second set of fields. In 522, a result may be automatically calculated by applying the mathematical operators to the numeric values. In 524, the result may be displayed on the display screen. In various embodiments, 522 and 524 may performed at different points in the method (e.g., after 520, 526, and 528).

In 526, user input may be entered (and therefore received into memory) to hide one of the sets of fields. In 528, the at least one column may be redisplayed by displaying the plurality of fields except for the hidden set of fields.

In 530, in one embodiment, user input may be entered to show the hidden set of fields. In 532, the at least one column may be redisplayed by displaying all of the sets of fields, including the fields that were previously hidden.

Although 520 through 532 are expressed in terms of two fields in a single column, the method may be applied to an arbitrarily large number of fields and columns. Furthermore, a set of fields may include operation fields, number fields, or comment fields. In one embodiment, a result may be automatically calculated by applying the mathematical operators in operation fields to the numeric values in number fields. In one embodiment, a single column label may be displayed as spanning the first and second field, a first field label may be displayed for the first set of fields below the single column label, and a second field label may be displayed for the second set of fields in a same row as the first field label below the single column label.

Spreadsheet Lines and Vertical Calculations in the Same Document

In one embodiment, a calcsheet may include a spreadsheet line: a kind of line that only has one field which spans the width of at least one column. In one embodiment, a spreadsheet line can include a comment, a number, or a formula. FIG. 7 shows the same calcsheet as FIG. 4, except the example in FIG. 7 includes spreadsheet lines that contain text data. Lines A1, A3, B3 and B12 in FIG. 7 are spreadsheet lines that contain descriptive comments. FIG. 8 shows a calcsheet that has spreadsheet lines (A7 through D10) with numerical data.

The ability to combine single-field spreadsheet lines with multi-field vertical calculation lines in a calcsheet may provide a significant advantage over calculator programs in at least two ways. First, the combination may allow a calcsheet to be much easier to read and understand and much more aesthetically pleasing by allowing comments to span multiple fields. This difference can be seen by comparing FIG. 4, without comments, and FIG. 7, with comments. This feature may also make it possible to produce a professional-looking business document with numerical data that is entered in the same familiar, intuitive way that it would be entered on a hand-held calculator. Second, the combination may allow the calcsheet to be used for both tabular repetitive data and vertical calculations, as shown in FIG. 8. This feature is not believed to be found in any calculator program or spreadsheet. More specifically, as FIG. 8 shows, the same column may contain vertical calculations as well as tabular spreadsheet data. This ability may allow a calcsheet to be arranged in a logical, easy to read, and aesthetically pleasing way.

Figure 49:
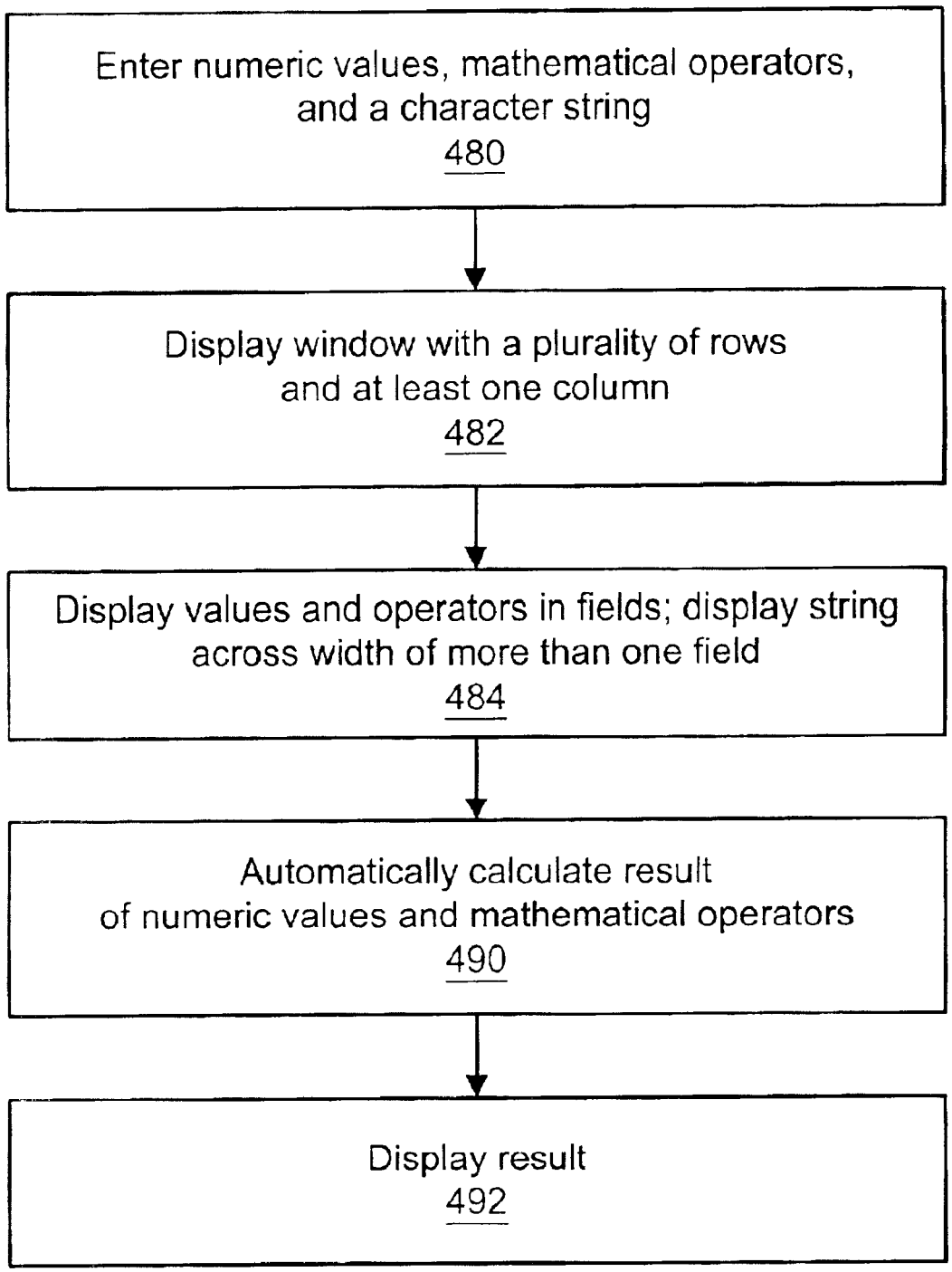
FIG. 49 is a flowchart illustrating a method of using spreadsheet lines and vertical calculations in a single document according to one embodiment.

FIG. 49 is a flowchart illustrating the use of spreadsheet lines and vertical calculations in a single document according to one embodiment. In 480, user input may be entered into a computer system (and received into a memory of the computer system), wherein the user input comprises a plurality of numeric values, one or more mathematical operators, and a character string.

In 482, a window may be displayed on a display screen coupled to the computer system, wherein the window comprises a plurality of rows and at least one column, wherein the at least one column comprises a plurality of number fields and a plurality of operation fields. In 484, the mathematical operators may be displayed in columnar format in the operation fields, the numeric values may be displayed in columnar format in the number fields, and the character string may be displayed in one of the rows such that the character string spans a width of at least one of the operation fields and one of the number fields. In various embodiments, 480 through 484 may be performed in different orders.

In 490, a result may be automatically calculated by applying the mathematical operators to the numeric values. In 492, the result may be displayed on the display screen. In one embodiment, multiple columns may be used, and each column may include one or more operation fields and one or more number fields. In one embodiment, a plurality of comment fields which may contain comment strings may be used.

The character string may be interpreted as different types of data. In one embodiment, the character string may be interpreted as one or more numeric values. In automatically calculating the result by applying the mathematical operators to the numeric values, the mathematical operators may be applied to the character string. In one embodiment, the character string may be interpreted as one or more mathematical operators. In automatically calculating the result by applying the mathematical operators to the numeric values, the character string may be applied to the numeric values. In one embodiment, the character string may be interpreted as one or more formulas. A result of at least one of the formulas may be calculated to generate a resulting numeric value. In one embodiment, the character string may be interpreted as one or more references to numeric values in other number fields. At least one of the references may be resolved to generate a resulting numeric value.

Formulas in Number Fields

In one embodiment, calcsheets may include formulas in number fields. FIGS. 9A and 9B and FIG. 10 show calcsheets with formulas in number fields of calc lines. The ability to put a formula in a number field is a powerful feature that has significant advantages.

This ability may further enhance the utility of a calcsheet for both vertical calculations and tabular, spreadsheet-style computations. FIG. 10 shows an example of a spreadsheet style table (columns B through G) constructed using calc lines that have their operation and comment fields hidden. The number fields of lines G4, G5, G6, G7 and G8 have formulas in them that add the four lines to their left. The formula of line G4 is shown as it is being edited. Note that the calcsheet also contains a vertical calculation in column A.

In one embodiment, vertical calculations may be simplified. FIGS. 9A and 9B show a modified version of the calcsheet in FIG. 7. Instead of the three lines in FIG. 7 for automobile related expenses (lines A6, A7 and A8), FIGS. 9A and 9B include only one line, A6, that combines all of these expenses.

In one embodiment, vertical calculations may be used for more complex calculations. The formulas in a number field may be arbitrarily complex arithmetic expressions with parentheses and advanced mathematical, trigonometric, statistical, and business functions. Therefore, it may be possible to use vertical calculations for very complex calculations that would either be very awkward or impossible to express with a calculator program.

Figure 47:
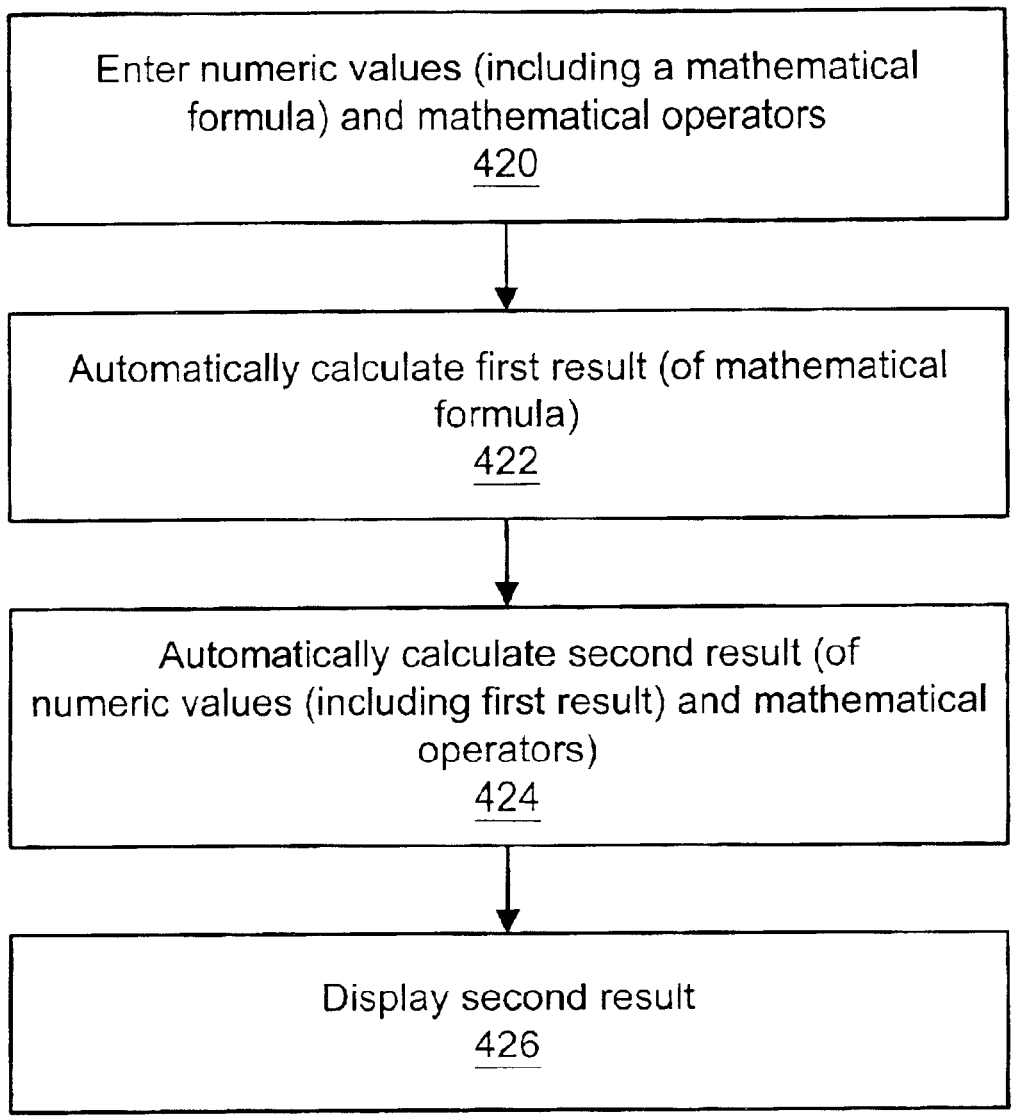
FIG. 47 is a flowchart illustrating a method of using formulas in number fields according to one embodiment.

FIG. 47 is a flowchart illustrating the use of formulas in number fields according to one embodiment. In 420, a plurality of numeric values may be entered (and therefore received into a computer memory) in a plurality of number fields. The plurality of number fields may be displayed in columnar format on a display screen. In one embodiment, the numeric values comprise at least one mathematical formula. In one embodiment, a set of one or more mathematical operators may also be entered in one or more operation fields, wherein the operation fields are displayed in columnar format on the display screen. In one embodiment, the number fields and the operation fields may be displayed in adjacent columns (i.e., columnar fields) which share a first single column label.

In 422, a first result of the mathematical formula may be automatically calculated. In one embodiment, the first result may be displayed on the display screen in the number field in which the mathematical formula was entered. In one embodiment, horizontal formulas may be used. In this embodiment, the mathematical formula and the first result of the mathematical formula may be displayed in one of the number fields. An equality character may be entered after entering the mathematical formula, and the first result may be displayed after the entering the equality character.

In 424, a second result may be automatically calculated as a function of the first result and the numeric values other than the at least one mathematical formula. In one embodiment, the second result may also be calculated as a function of the mathematical operators.

In 426, the second result may be displayed on the display screen. In one embodiment, the second result may be displayed in the same column as the column in which the plurality of numeric values were entered.

In one embodiment, 420 through 426 may be used in a matrix of fields having multiple columns. In this embodiment, a third result may be calculated and displayed based on numeric values in number fields in a second column.

Changing the Order of Fields

In one embodiment, a calcsheet may include the ability to change the order of fields within a column. FIG. 11 illustrates this feature. FIG. 11 shows the same calcsheet as FIG. 7, except in FIG. 11 the comment fields are displayed on the left side of the number field and the operation fields are hidden. This is a format that is often used in corporate financial statements: descriptive comment on the left and numbers on the right. FIG. 11 is therefore an example of how the calcsheet, unlike a spreadsheet or calculator program, may allow data to be entered in the intuitive calculator input format and displayed in a format that is suitable for professional quality business documents.

Figure 50:
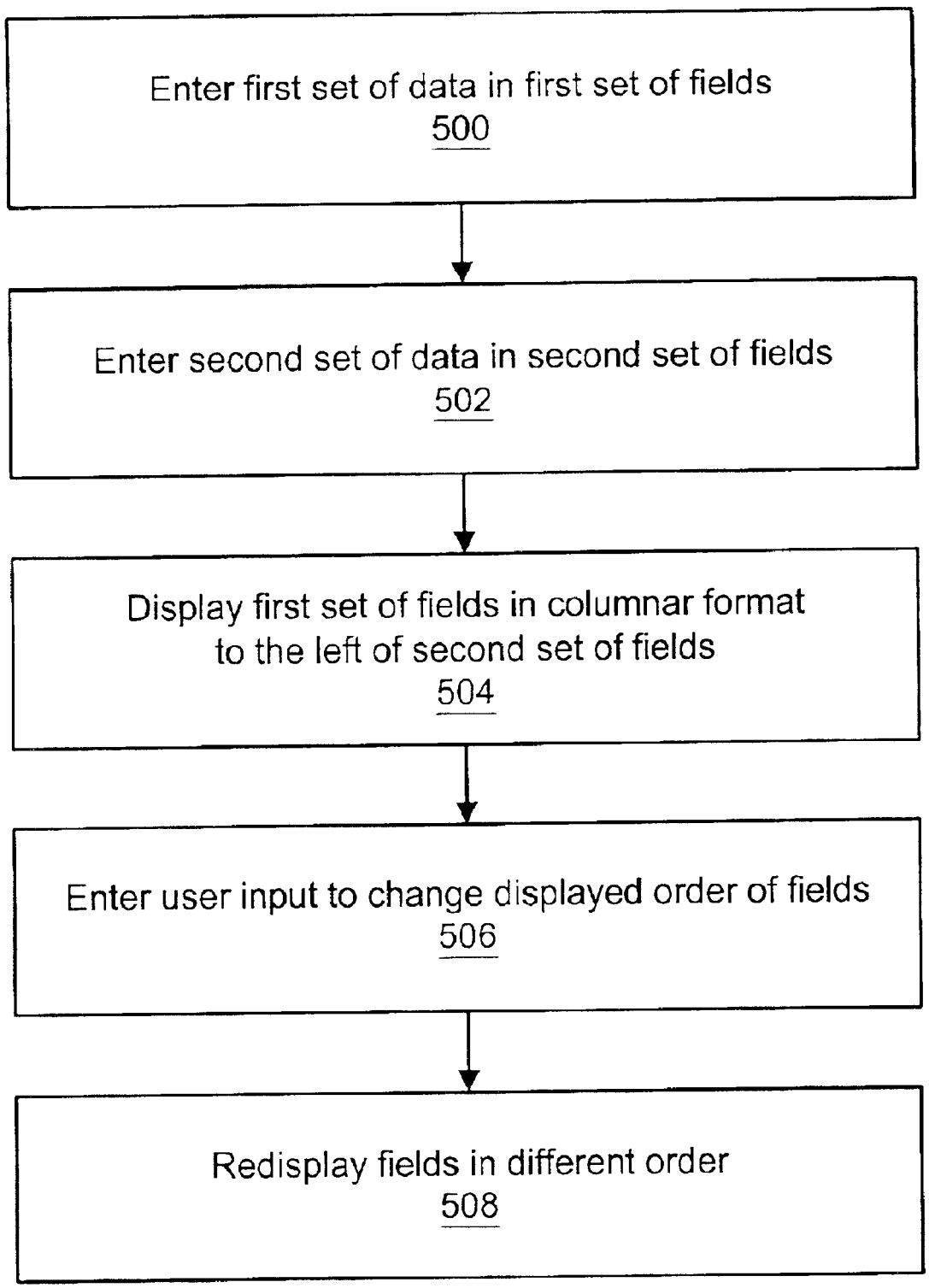
FIG. 50 is a flowchart illustrating a method of using multi-field columns with modifiable field order according to one embodiment.

FIG. 50 is a flowchart illustrating the use of multi-field columns with modifiable field order according to one embodiment. In 500, a first set of data may be entered (and therefore received into memory) in a first set of fields displayed in columnar format in a first column on a display screen. In 502, a second set of data may be entered in a second set of fields displayed in columnar format in the first column on the display screen, wherein the first column comprises the first set of fields displayed vertically and the second set of fields displayed vertically, and wherein the first column comprises a single column label which spans the width of one of the first set of fields and one of the second set of fields. In 504, the first set of data may be displayed in the first set of fields and the second set of data in the second set of fields, wherein the first set of fields is displayed to the left of the second set of fields.

In 506, a user may enter input (such as by use of a mouse and/or keyboard, for example) to display the fields in a different order. In 508, the first set of data may be redisplayed in the first set of fields and the second set of data may be redisplayed in the second set of fields, wherein the first set of fields is displayed to the right of the second set of fields.

Although 500 through 508 are expressed in terms of two fields in a single column, the method may be applied to an arbitrarily large number of fields and columns. Furthermore, a set of data and fields may include, respectively, mathematical operators and operation fields, numeric values and number fields, and comment strings and comment fields. In one embodiment, a result may be automatically calculated by applying the mathematical operators to the numeric values. In one embodiment, a single column label may be displayed as spanning the first and second field, a first field label may be displayed for the first set of fields below the single column label, and a second field label may be displayed for the second set of fields in a same row as the first field label below the single column label.

Parentheses in Vertical Calculations

In one embodiment, a calcsheet may include the ability to put parentheses in separate lines of a vertical calculation in order to modify the order of evaluation. This ability is shown in FIG. 14, where the calculation in column B is the same as the calculation in column A but with parentheses added. It is not believed that this feature can be found in any calculator program or spreadsheet.

Figure 52:
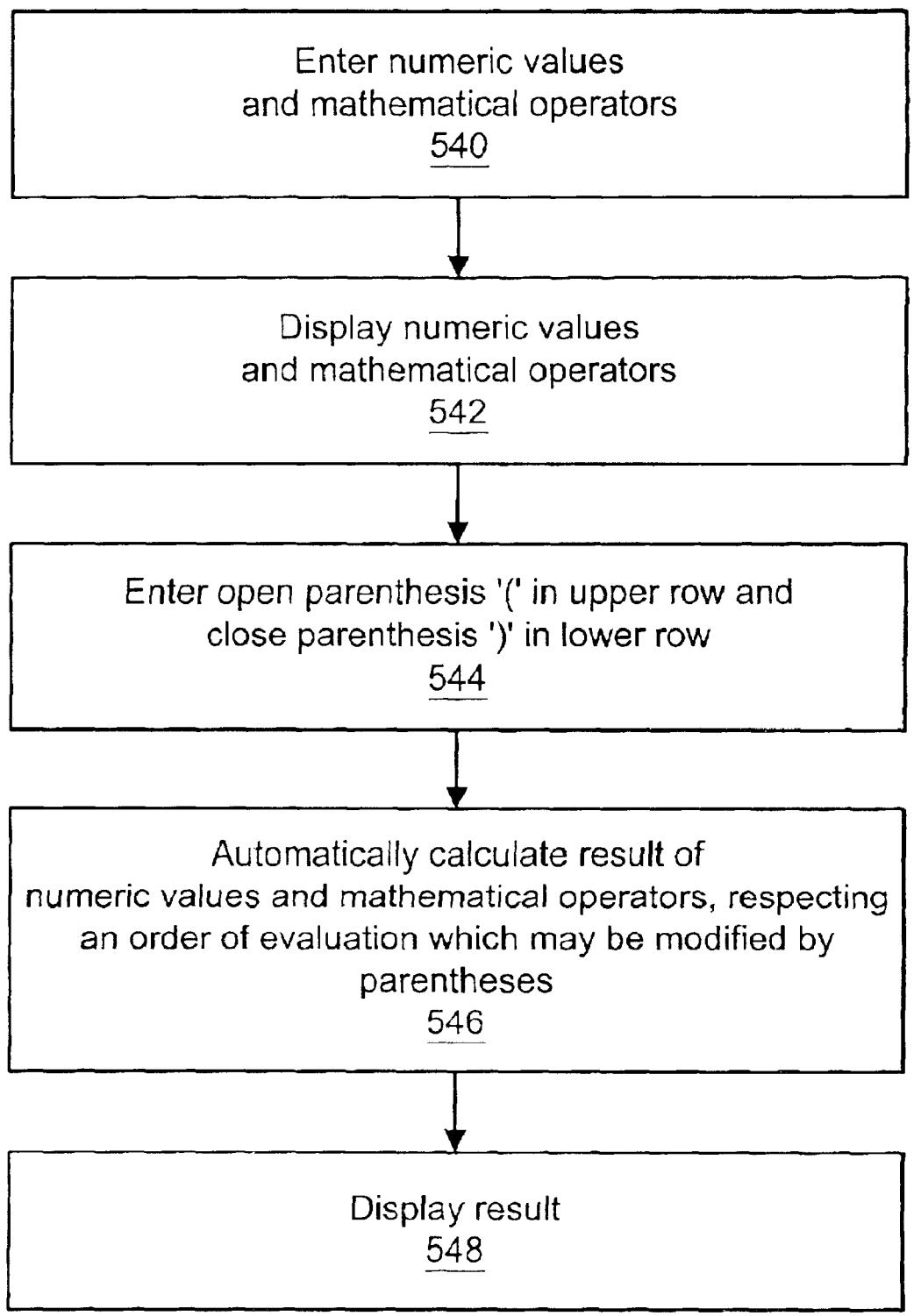
FIG. 52 is a flowchart illustrating a method of vertical calculation using vertical parentheses according to one embodiment.

FIG. 52 is a flowchart illustrating the use of vertical parentheses according to one embodiment. In 540, one or more mathematical operators and a plurality of numeric values may be entered (and therefore received into memory). In 542, the mathematical operators may be displayed in one or more operation fields in columnar format down at least one of a plurality of rows on a display screen, and the numeric values may be displayed in a plurality of number fields in columnar format down the plurality of rows on the display screen. The operators and numeric values may be displayed as they are individually entered.

In 544, an open parenthesis character may be entered in a field in an upper row, and a close parenthesis character may be entered in a field in a lower row, wherein the lower row is displayed below the upper row on the display screen. In various embodiments, the parentheses may be entered into number fields, operation fields, comment fields, or a combination of fields. In various embodiments, steps 540, 542, and 544 may be performed in a different order or substantially simultaneously.

In 546, a result may be automatically calculated by applying the set of mathematical operators to the set of numeric values and by following an order of evaluation which respects the open and close parentheses. Various orders of evaluation are discussed elsewhere herein. In 548, the result may be displayed on the display screen. In one embodiment, 540 through 548 may be performed for a plurality of columns.

Calculator Input Mode

In one embodiment, a calcsheet may include a calculator input mode. In this mode, as the user enters calculations in hand-held calculator format, the calcsheet responds to each character as it is entered and automatically inserts new lines, switches input focus to the appropriate fields, places characters into the appropriate fields, and performs any other tasks needed to display the calculations vertically. This feature may provide a significant advantage over existing calculator programs which fail to provide a clear visual indicator of how the tape will be modified as calculations are entered. It is believed that existing calculator programs also do not allow new vertical calculations to be entered while editing previously entered data. Spreadsheets, of course, do not support vertical calculations (as described herein) at all.

Figure 48:
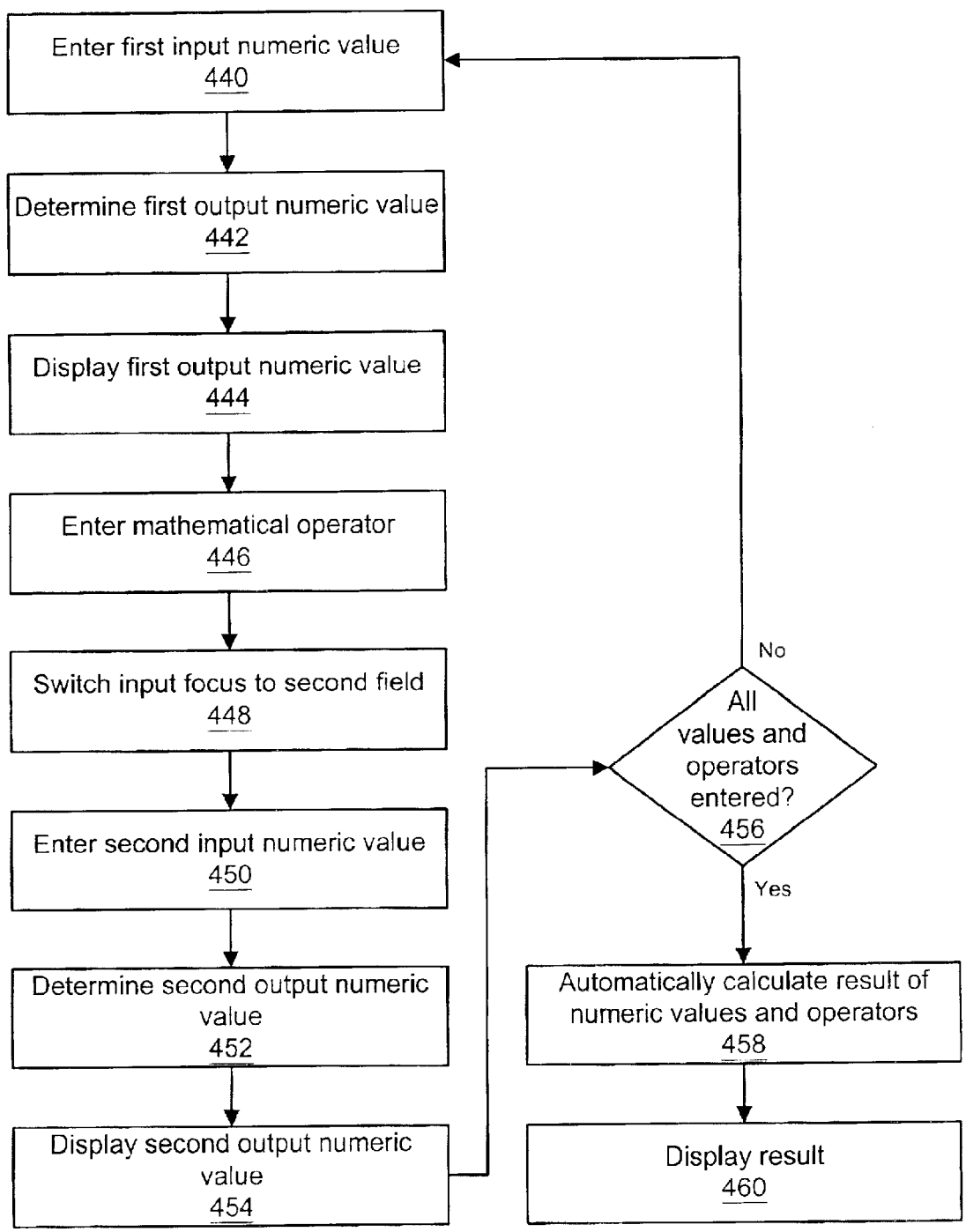
FIG. 48 is a flowchart illustrating a method of using calculator input mode for entry of data into a calcsheet according to one embodiment.

FIG. 48 is a flowchart illustrating the use of calculator input mode according to one embodiment. In 440, a first input numeric value may be entered (and therefore received into a memory). In 442, a first output numeric value may be determined based on the first input numeric value. In 444, the first output numeric value may be displayed in a first field on a display screen, wherein the first field comprises an intersection of a first column and a first row. In one embodiment, step 444 may be performed substantially simultaneously with (e.g., immediately after) steps 440 and 442.

In 446, a mathematical operator may be entered. In 448, input focus may be automatically switched to a second field in response to the entering the mathematical operator, wherein the second field is displayed below the first field on the display screen. In one embodiment, the second field may be automatically inserted in response to the entering the mathematical operator, wherein the second field comprises an intersection of the first column and a second row below the first field, and wherein the second field is initially displayed as empty.

In 450, a second input numeric value may be entered. In 452, a second output numeric value may be determined based on the second input numeric value. In 454, the second output numeric value may be displayed in the second field on the display screen. In one embodiment, step 454 may be performed substantially simultaneously with (e.g., immediately after) steps 450 and 452. In some cases, one of the output numeric values may be substantially identical in form to its corresponding input numeric value.

440 through 454 may be repeated until all input numeric values and mathematical operators in a desired calculation have been received into the memory, as shown in 456. In 458, a result of the input numeric values and mathematical operators entered in steps 440 through 456 may be automatically calculated.

In 460, the result may be automatically displayed at a field on the display screen in the first column below the output numeric values and mathematical operators. In one embodiment, one or more of the input numeric values or mathematical operators may be modified by the user in its location on the display screen. The result of the input numeric values and mathematical operators may then be recalculated and redisplayed.

In one embodiment, 440 through 460 may be performed in a second column on the display screen.

Subtotal Function

In one embodiment, a calcsheet may use a subtotal function. A subtotal function may be entered into a number field and may return a subtotal of one or more numeric values in number fields preceding the number field in which the subtotal function was entered. In one embodiment, the subtotal function will apply the appropriate mathematical operators to the numeric values in all the number fields above that of the subtotal function. If, however, the subtotal function follows an open parenthesis character (e.g., an open parenthesis character appears on a line preceding the line with the subtotal function), then the function will return the subtotal starting from the line containing the previous open parenthesis character. In other words, vertical parentheses may be used to select a subset of the preceding number fields to sum. In one embodiment, the subtotal function may be part of a larger mathematical formula. In other words, the subtotal function may be evaluated, and then the resulting value may be used in another formula.

Figure 53:
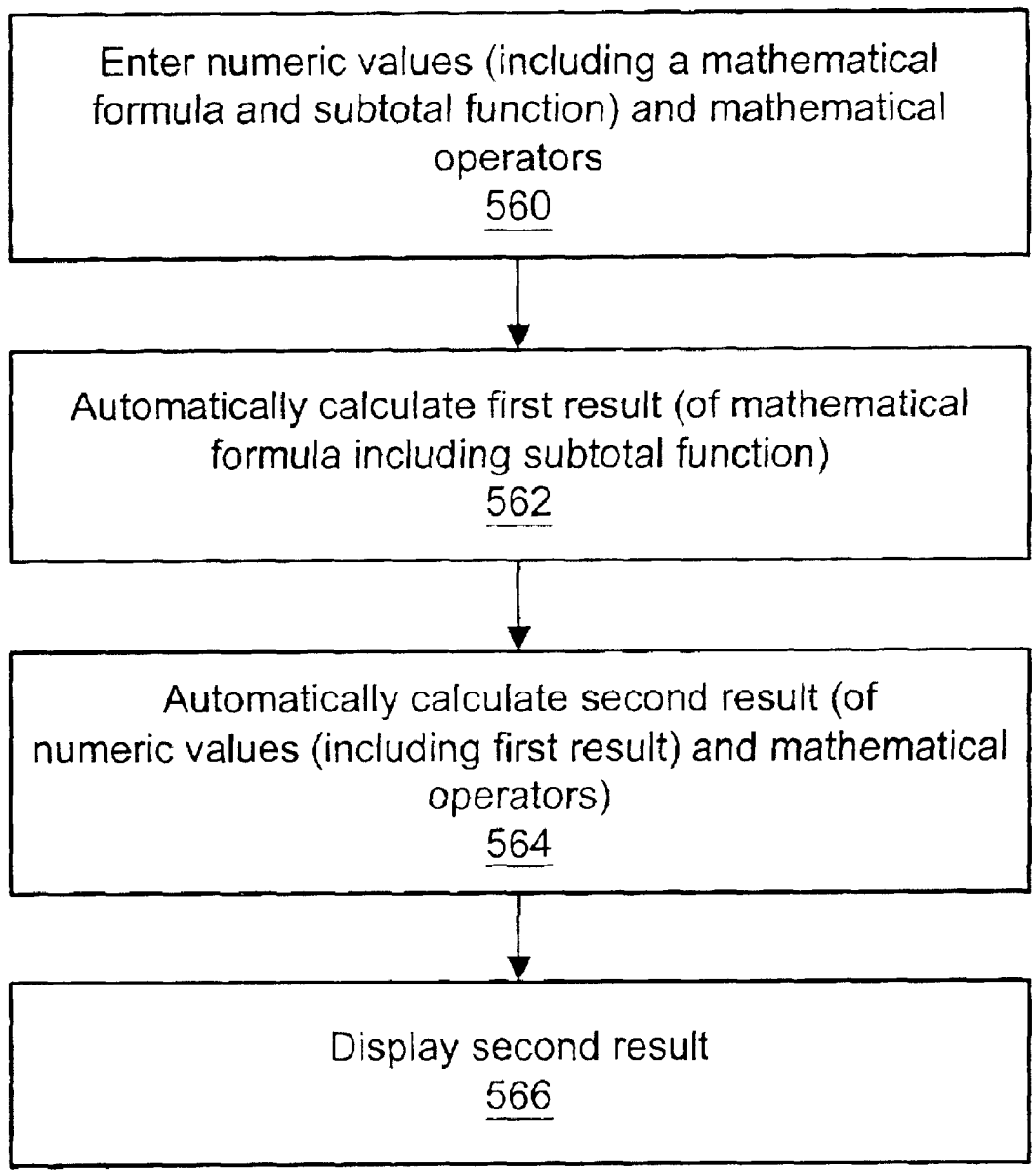
FIG. 53 is a flowchart illustrating a method of using a subtotal function according to one embodiment.

FIG. 53 is a flowchart illustrating the use of using a subtotal function according to one embodiment. In 560, a plurality of numeric values may be entered (and therefore received into a computer memory) in a plurality of number fields. The plurality of number fields may be displayed in columnar format on a display screen. In one embodiment, the numeric values include at least one mathematical formula, and the mathematical formula includes a subtotal function. In one embodiment, a set of one or more mathematical operators may also be entered in one or more operation fields, wherein the operation fields are displayed in columnar format on the display screen. In one embodiment, the number fields and the operation fields may be displayed in adjacent columns (i.e., columnar fields) which share a first single column label.

In 562, a first result of the mathematical formula may be automatically calculated, including automatically calculating a subtotal of a plurality of the numeric values in a plurality of number fields preceding the number field in which the mathematical formula was entered. For example, all the number fields preceding the number field with the formula, or some subset of those fields, may be subtotaled by applying the appropriate mathematical operators. In one embodiment, the first result may be displayed on the display screen in the number field in which the mathematical formula was entered. In one embodiment, horizontal formulas may be used. In this embodiment, the mathematical formula and the first result of the mathematical formula may be displayed in one of the number fields. An equality character may be entered after entering the mathematical formula, and the first result may be displayed after the entering the equality character.

In 564, a second result may be automatically calculated as a function of the first result and the numeric values other than the at least one mathematical formula. In one embodiment, the second result may also be calculated as a function of the mathematical operators.

In 566, the second result may be displayed on the display screen. In one embodiment, the second result may be displayed in the same column as the column in which the plurality of numeric values were entered.

In one embodiment, 560 through 566 may be used in a matrix of fields having multiple columns. In this embodiment, a third result may be calculated and displayed based on numeric values in number fields in a second column.

Single Key Editing and Navigation

In one embodiment, a calcsheet may be easily modified (e.g., navigated and/or edited) using single keystrokes. One of the advantages of a calcsheet over spreadsheets and calculator programs is the ease with which a calcsheet may be modified. In one embodiment, when editing a field in a calcsheet, the user may switch to editing any adjacent field with a single keystroke using the arrow or tab keys. Therefore, the user may navigate anywhere in a calcsheet and edit any field using only the arrow keys, which usually are grouped together on a keyboard.

Single-key editing and navigation may provide a significant usability advantage. In calculator programs, it is not believed to be possible to use the keyboard to switch editing to an adjacent field. Instead, the user must double click on the adjacent field with the mouse. Spreadsheets do allow the user to switch editing to an adjacent cell with the keyboard but instead require multiple keystrokes to do so, and typically with keys that are not grouped together on the keyboard.

FIG. 17A and FIG. 17B show how hitting the right arrow or right tab key switches from editing the number field, FIG. 17A, to editing the comment field, FIG. 17B, in one embodiment. The user can now immediately modify the existing comment text. In one embodiment, the up arrow, down arrow, left arrow, and left tab keys can also be used to switch editing to fields above, below or to the left of the field being edited.

Basics of Operation: Lines, Fields, Rows, and Columns

In one embodiment, a calcsheet includes lines which are arranged in a matrix of rows and columns on a display screen of a computer system. A line is typically displayed as a rectangular area on the screen. A line includes one or more fields, and each field may have a character string associated with it. A field may be displayed as a rectangular area on the screen in which its character string is displayed, a shown in FIG. 18A. A field's character string may be empty, in which case no characters are displayed in the field. A line that has at least one field whose string is not empty is referred to as a non-null line. If each field in a line has an empty string then the line is referred to as a null line or an empty line. In one embodiment, the fields in a line are arranged contiguously, side by side on the screen. In one embodiment, each field in a line is the same height, each line in a row is the same height, and each line in a column is the same width.

In one embodiment, when a line is inserted into a column, substantially all the subsequent lines in the column are moved down on the screen. Likewise, when a line is deleted from a column, substantially all the subsequent lines in the column are moved up on the screen.

Two specific types of fields are an operation field and a number field. A calc line (also referred to as a calculation line) is a particular type of line that has at least an operation field and a number field, and may have other fields as well, such as a comment field. An example of a calc line with an operation field 2, a number field 3, and a comment field 4 is shown in FIG. 19.

Operation Field

In one embodiment, a calc line's operation field is used to contain a character string such as "+", "−", "*" or "/" that represents an arithmetic operation to be performed on the numeric values of the number fields of calc lines. The arithmetic operation that the string represents is referred to as the calc line's operation or arithmetic operation.

Number Field

In one embodiment, a calc line's number field is used to contain a character string that represents a numeric value, which may be referred to as the calc line's value or numeric value. As used herein, "entering (or receiving into memory) a numeric value" may include entering (or receiving into memory) the character string that represents the numeric value. The character string input by a user may also be referred to as an input numeric value. A number field string can be a literal number, such as "−123.45" or "3.1415E+03". A number field string can be a reference to another line in the calcsheet, such as "B3" which refers to the line in column B, row 3 of the calcsheet (line B3). In one embodiment, the numeric value of a reference string is the numeric value of the number field of the line it refers to.

A number field string can also be a function which evaluates to a number, such as "cos(90)" or "sum(A2, A3, A4)". A number field string can also be a formula that represents a number. In one embodiment, a formula is string with numeric entries separated by operation characters (see the section "Input Characters" for a definition of operation characters). An example of a formula is "4*12+36" which evaluates to the number 84. In addition to literal numbers, a formula's numeric entries may include references and functions. A formula can also contain parentheses to modify the order of evaluation. For example if the line B3 has a numeric value of 8, then the formula "4*(−55/(B3+3))+sin(90)" evaluates to the numeric value −19. In order to determine how to interpret a number field's character string, a calcsheet may analyze the string and determine if it is a valid literal number, reference, function, or formula.

The format of a function or reference may vary widely. In one embodiment, for example, functions and formulas may be prefixed by an "=" character, e.g. "=sum(A2, A3, A4)" and "=B3", which is a format used by many spreadsheets. Characters other than parentheses and commas may be used to specify parameters to a function, e.g. "sum<A2 A3 A4>" uses "<" and ">" to enclose the parameters and blanks to separate parameters from each other.

A number field has an output character string that is displayed when the number field does not have the focus (the concept of focus is described below). The output string may be referred to herein as an output numeric value. The output character string may be generated from the number field's character string and may contain the numeric value of the character string in some format specified by the user. For example, if the character string is "1234", then the output string might be "1,234.00" or "1.234E+03". FIG. 18A shows a number field with its character string displayed in it, and FIG. 18B shows the same field displaying an output character string that is formatted to have 2 decimal places. As used herein, "displaying a numeric value" may include displaying the output character string and/or the input character string.

Other Fields

A calc line may also contain other types of fields, including a comment field. A comment field is used to contain a character string that provides descriptive commentary. FIG. 19 shows an example of a calc line with an operation field 2, a number field 3, and a comment field 4.

Visual Aids

In one embodiment, a calcsheet has visual constructs displayed to help the user distinguish the rows, columns and fields. For example, grid lines may be drawn around each field's rectangle. At the top of each column, a column header may be displayed indicating which column (A, B, C etc.) it is. FIG. 20 shows a column header 7. At the top of each column a field header may also be displayed over each field indicating which type of field (operation, number, comment, etc.) it is. FIG. 21 shows a column with field headers 5. In one embodiment, the column and field headers are displayed at the top of each screen no matter which rows are visible on the screen. To the side of each row, a row header may be displayed indicating which row (1, 2, 3 etc.) it is. FIG. 22 shows a row header 6. In one embodiment, the row header is typically displayed on the side of the screen no matter which columns are visible.

Focus

The term focus is used to describe a location at which input characters will be sent in a calcsheet, e.g., which field is being edited. The field that will receive character input is said to have the focus, it is also referred to as the focus field. In one embodiment, only one field in a calcsheet may have the focus at any given time. The term focus character refers to the zero-based index into the focus field's string where input characters will be placed. When the focus character is the "zeroth" character in a field's string (i.e., any input character will be placed at the start of the string), then the focus character is said to be at the start of the field. When the focus character is the last character in a field's string (i.e., any input character will be appended to the end of the string), the focus character is said to be at the end of the field. The line that contains the focus field is said to have the focus, and it is also referred to as the focus line. The column and row that contain the focus line are also said to have the focus, and are referred to as the focus column and the focus row. In one embodiment, it is possible to change which field has the focus. The phrase set the focus to a field means to cause subsequent character input to be sent to a field. Setting the focus to a field is also referred to as setting the focus to the line that contains the field.

In FIG. 23, line A3 has the focus. Specifically, line A3's comment field is the focus field, which is indicated visually by drawing a black box around the field. The focus character is zero. Therefore, if a character is typed in, the character will be placed at the beginning position in the character string, or before the letter "o", because the focus is at the start of the field. In one embodiment, the focus character is identified on the screen by a visual indicator. The visual indicator of the focus character is commonly referred to as a cursor. In FIG. 23, the cursor is displayed as a vertical line just before the "o" in the line A3's comment field. This convention will be used to represent the cursor in all figures throughout this description, though there are many other techniques that can be used to visually identify the focus character. Note that drawing a black box around the focus field is not required, but it is helpful in order to visually identify the focus field.

Focus Indicator in Headers

In FIG. 23, the column that contains the focus line, column A, has its column header differentiated visually in that it is made to look indented. This differentiation indicates that a line in column A has the focus. Similarly the row header for the row that contains the focus line, row 3, is differentiated visually, as is the field header for the focus field (the comment field of column A). Having multiple columns with multiple fields in each column makes it difficult for the user to distinguish which line and which field within that line has the focus. The combination of a visually different column header and a visually different field header is particularly useful for helping to identify the line and field that have the focus. It is not believed that any calculator program or spreadsheet includes this function. (Note that in these examples, the technique for visually differentiating the headers is to make them appear to be indented, although any number of other techniques would work as well, as long as the focus headers are visually distinct.)

Single Edit String

In one embodiment, one variation on focus is to display a single "edit string" in a line's rectangle when the line has the focus, instead of displaying each of the line's field strings in their individual field rectangles. The edit string may include the character strings of each of a line's fields combined into one string, with delimiter characters separating each field's strings within the edit string. The delimiter character may be any character, including a blank or a tab, both of which are commonly used to delimit fields within a character string in a many applications. Thus a substring of the edit string may correspond to each of the fields of the focus line. Changes to the edit string may be saved in the corresponding character string of each field in the line. When the line loses focus, each field may have its character string displayed in it (or its output string in the case of a number field). FIGS. 24A and 24B show an example using blanks as delimiter characters. FIG. 24A shows line A2 when it has the focus. The operation field string "+" and the number field string "2" and the comment field string "oranges" have been combined with blanks in between them into one edit string, "+2 oranges", which is displayed in line 2 instead of displaying the individual field character strings. FIG. 24B shows line A2 when it is not being edited: the operation, number and comment strings are displayed in their respective fields.

An edit string may not have a substring and a delimiter for each field of a line, in which case one or more field strings of the line will be empty strings. In this case, the edit string may be interpreted in context to determine which fields' strings will correspond to substrings of the edit string. For example, in a line with the edit string "1 apple", the substring "1" will correspond to the number field string, the substring "apple" will correspond to the comment field string, and the operation field string will be empty. Line A1 in FIG. 24A shows how a line with an edit string of "1 apple" looks when the line does not have the focus. In one embodiment, a line's field strings are "logical" constructs, and though they are displayed as separate strings, they may or may not be "physically" stored as separate strings by the calcsheet program. Likewise, a line's edit string is also a "logical" construct, and although it is displayed as a single string, it may or may not be stored as a single string by the calcsheet program.

Character Input Means

It is recommended that a calcsheet have a means for inputting characters, referred to as a character input means, which takes input from a human operator and translates it into input characters which are sent to the calcsheet program. Examples of means for entering characters include a keyboard, voice recognition means, and graphical calculator software for use with a pointer device (e.g., a mouse). A calcsheet may use any combination of these devices. As shown in FIG. 43, a typical computer has a keyboard which will supply input characters to substantially any program that runs on the computer.

Figure 28A:
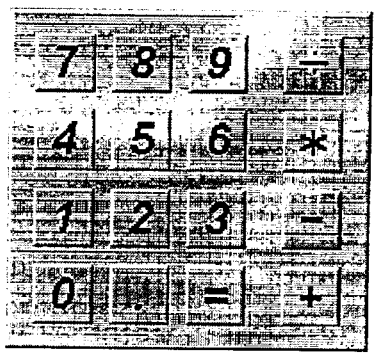
FIG. 28A shows a minimal graphical calculator input means.
Figure 28B:
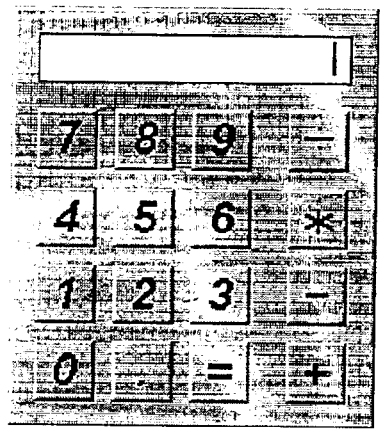
FIG. 28B shows a more typical graphical calculator input means with a display field, according to one embodiment.

Unlike a keyboard, a graphical calculator input means is typically not standard with a computer. An example calculator window of a basic graphical calculator character input means is illustrated in FIG. 28A. It includes a pointer device such as a mouse that the user can use to point to a button and click on it. An image such as FIG. 28A is displayed on the screen with buttons representing the numbers 0 through 9, a decimal character (i.e. "."), plus the basic arithmetic operations. When the user clicks on a button with the pointer device, the character that the button represents is input to the calcsheet. For example, clicking on the "+ button" will input the character "+", clicking on the "4 button" will input the character "4", etc. A graphical calculator may include a one line display window, such as the one in the top of FIG. 28B, which emulates the display on a hand held calculator and displays numbers as they are entered and totals as they are calculated. A graphical calculator may also include buttons for the letters of the alphabet and/or for punctuation symbols, etc.

Input Characters

In one embodiment, an input character is a logical construct which has a character value and may also include other information that is specific to the input means. For example, with a keyboard input device an input character may include information such as whether a ctrl, alt, or shift key was depressed when the character was entered. Further expanding this example, on many keyboards a single key, known as the tab key, is used for both the left tab and right tab functions. If the tab key is hit without simultaneously depressing the shift key, then the right tab function is performed, but if the tab key is hit while simultaneously depressing the shift key then the left tab function is performed. A left tab input character might then include a character value indicating that the tab key has been hit plus an indicator that the shift key was depressed. On the other hand, the keyboard input means may generate a unique character value for the left tab function, with no indicator of whether the shift key was depressed.

The term "logical construct" here means that an input character is not necessarily implemented as a single object, structure, or as a single contiguous section of storage. For example, information about whether a key such as ctrl or shift was depressed when the character was entered might be obtained by invoking an operating system service rather than examining some data in an input character structure. Such information might also be provided to the calcsheet application by the operating system in the form of one or more parameters that are supplied to a character input handling routine. The way that information about an input character is supplied is largely determined by the operating system that the application is developed for and/or the software development tool that the application is developed with.

Characters may be classified into two separate groups: text characters and control characters. Text characters include visible display characters, including letters, numbers, punctuation marks, and other symbols. Control characters represent requests by the user to perform a function. Control characters may include "non-text" keys on a keyboard, such as the page up, page down, and arrow keys. Control characters may also be generated by hitting a text character key on the keyboard, such as "F", often while some other key, such as a ctrl key, is depressed.

In one embodiment, the numeric separator character is a text character that is used to separate groups of digits. The character that is used for a numeric separator varies by country and/or language. In the United States it is typically a ",", and is used to separate every three digits to the left of the decimal point. In many European countries it is a ".". The decimal character is a text character that is used to separate the whole part of a number from the fractional part, and it also varies by country and/or language. In the United States it is usually a ".", in many European countries it is a ",". The text characters "0", "1", "2", "3", "4", "5", "6", "7", "8", "9", plus the decimal collectively called numeric characters. The text characters "+", "−", "*", and "/" are called operation characters and may represent the arithmetic operations addition, subtraction, multiplication and division respectively. The character "x" may also be used to represent multiplication. A total operation character is a character that is used to cause a total calc line to be generated. The character used for a total operation character is arbitrary, and more than one character may be used. The text character "=" is often used in calculator programs. Some calculator programs use the character "T" (for total) or "S" (for sum). For clarity and consistency in this invention description, the string "=" will be used to designate the total operation.

Vertical Calculations

A vertical calculation (also referred to as a calculation) is a contiguous series of calc lines in a column that can be evaluated to produce a value by applying the arithmetic operations of the calc lines to the numeric values of the calc lines.

In one embodiment, each calc line is associated with a vertical calculation (i.e., the vertical calculation that contains that calc line). At a minimum, a calc line's vertical calculation may include the calc line itself. When a change is made to a calc line's number or operation field, the calc line's vertical calculation may be evaluated. This can be done at any or all of several points: for example, when the field loses focus, every time a character is entered, or when a specific command is issued by the user to cause re-evaluation. For example, FIG. 14 contains a calculation including lines A1, A2, A3, A4 and A5. Each of these lines is said to have that calculation associated with it. If the number or operation field of any of these lines is changed, then the calculation will be reevaluated in one embodiment.

There are various formats that vertical calculations may have which are determined by the order that the operations are applied to the numeric values. These orders of evaluation are discussed as follows.

Sequential Order of Evaluation

In sequential order of evaluation according to one embodiment, the four basic arithmetic operations, "+", "−", "*", and "/" operate on two numbers known as operands. The first operand is the value of the vertical calculation up to the operation, and the second operand is in the number field of the calc line that the operation is in. In sequential order of evaluation, each operation is applied to each number in the sequential order that they appear in the calculation. The calculation in column A in FIG. 14 demonstrates sequential evaluation: 3 is added to 4 producing a value of 7, which is added to 5 producing a value of 12, which is multiplied by 6 to produce a final value of 72 for the calculation.

Algebraic Order of Evaluation

Algebraic order of evaluation is similar to sequential order, except that all multiplication and division operations are performed before any addition and subtraction operations, and those results are used as operands for any adjacent addition or subtraction operations. Multiplication and division operations are performed first in the order that they appear in the calculation, and then addition and subtraction operations are performed in the order that they appear in the calculation. The calculation in column A in FIG. 15 demonstrates algebraic evaluation. The multiplication operations are performed first: 3 is multiplied by 4 producing a value of 12, 5 is then multiplied by 6 producing a value of 30. Then the addition operation is performed on the results of the multiplication operations: 12 is added to 30 producing a final value of 42 for the calculation.

Adding Machine Order of Evaluation

Another popular order of evaluation for vertical calculations is adding machine order, which is commonly used in the paper tape of adding machines. Adding machine order is based on the way calculations are entered on an adding machine: when a number is entered it must be followed by a "+" or "−" which indicates whether the number will be added or subtracted from a calculation value. Thus an adding machine format calculation may include a series of calc lines with a number in the number field and an addition or subtraction operation in the operation field. When evaluating an adding machine format calculation, the calcsheet may maintain a calculation value to which it adds or subtracts each number in the calculation based on the operation in the calc line.

Using adding machine order, the calculation in column A of FIG. 41 would be evaluated as follows: The calculation value is initialized to zero, then 1 is added to the calculation value because the number field of line A1 is 1 and the operation field is a "+", then 2 is subtracted from the calculation value because line A2's number field is 2 and its operation is "−", and then 3 is added to the calculation value because line A3 has 3 in its number field and its operation field is "+". The total operation in line A4 may cause the calculation value, 2, to be displayed in line A4's number field. Note that the operation field is to the right of the number field, which is typical but not required for adding machine format calculations.

There are various schemes used by adding machines and calculator programs for allowing multiplication and division operations to be in an adding machine format vertical calculation. Examples of two possible orders of evaluation are shown in columns B and C of FIG. 40 and are described below, though other orders could also be used.

Figures 40A, 40B, 41, 42:
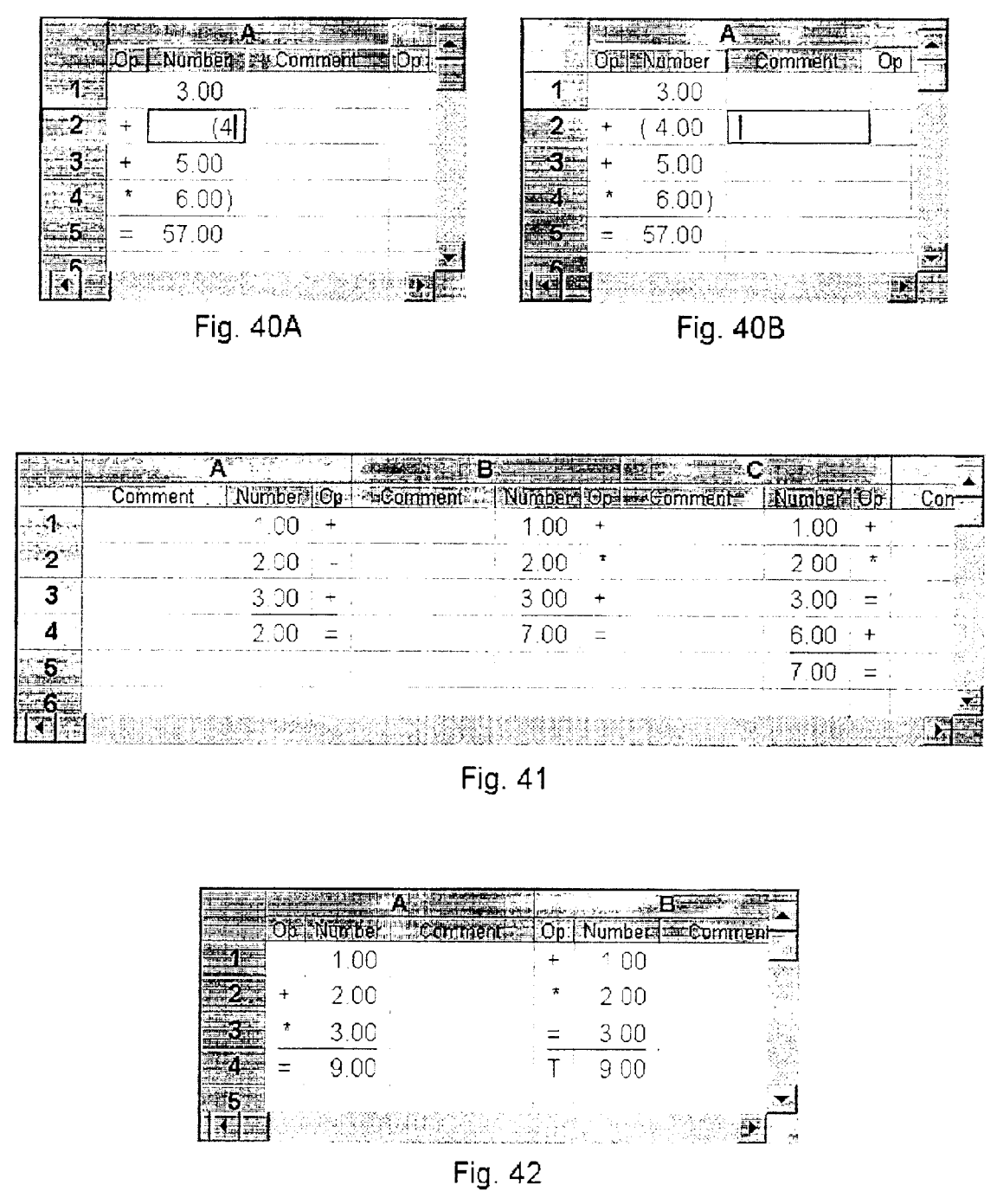

The order of evaluation demonstrated in column B of FIG. 41 is as follows: the calculation value is initialized to zero, 1 is added to the calculation value since line B1 has a number field of 1 and an operation of "+", 2 is multiplied by 3 since line B2 has a number field of 2 and an operation of "*" and line B3 has a number field of 3, yielding a value of 6 for the multiplication which is then added to the calculation value since the operation field of line B3 is a "+". Finally, the totals operation in line B4 may cause the calculation value of 7 to be displayed in line B4's number field.

The order of evaluation demonstrated in column C of FIG. 41 is as follows: the calculation value is initialized to zero, 1 is added to the calculation value since line C1 has a number field of 1 and an operation of "+", 2 is multiplied by 3 since line C2 has a number field of 2 and an operation of "*" and line C3 has a number field of 3, yielding a value of 6 for the multiplication which is then displayed in the number field of line C4 because line C3's operation field is a total operation. 6 is then added to the calculation value since the operation field of line C4 is a "+". Finally, the totals operation in line C5 may cause the calculation value of 7 to be displayed in line C5's number field.

Equals Lines

Figures 35A, 35B, 36, 37:
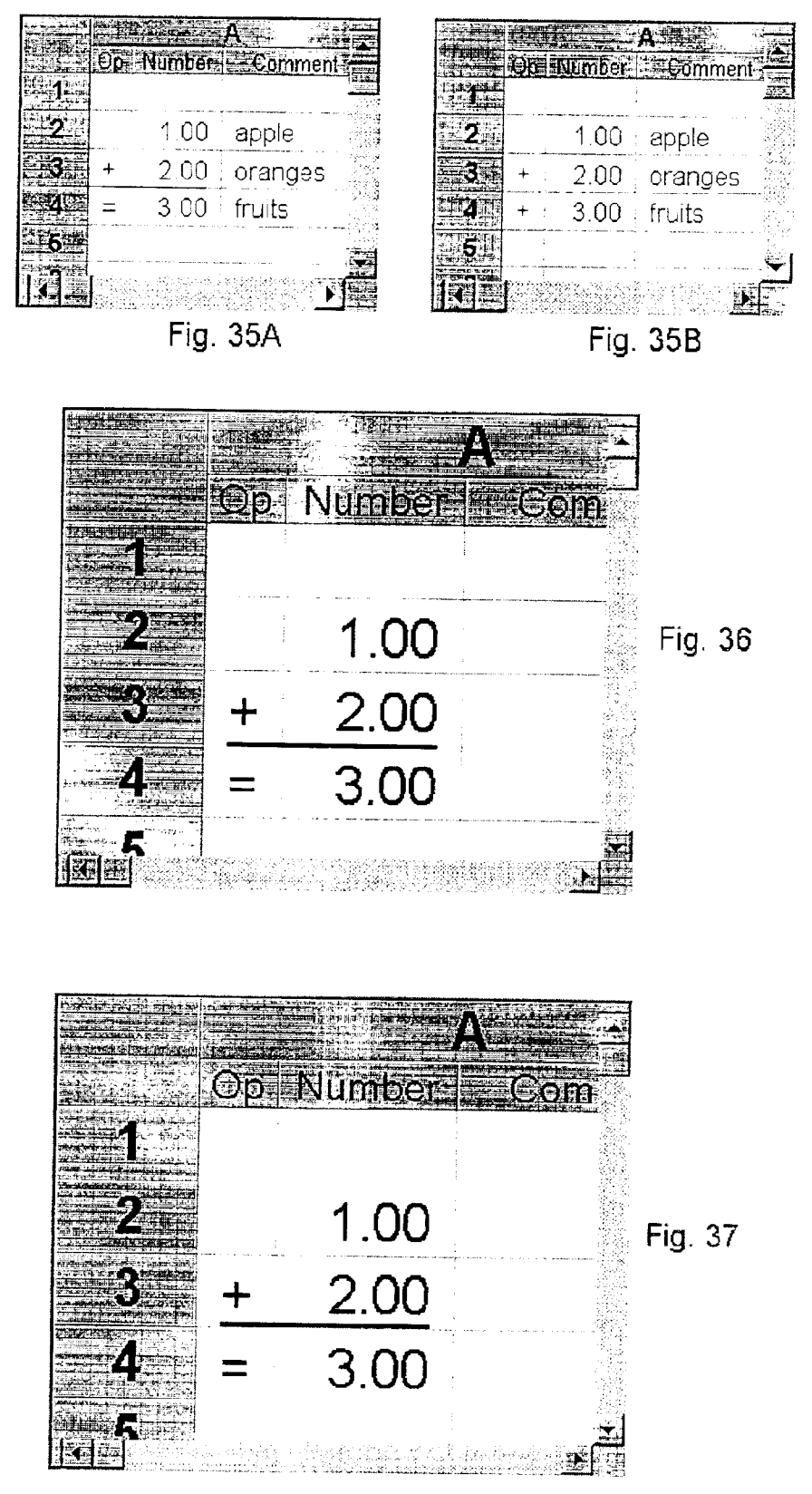
Figures 38, 39A, 39B, 39C, 39D:
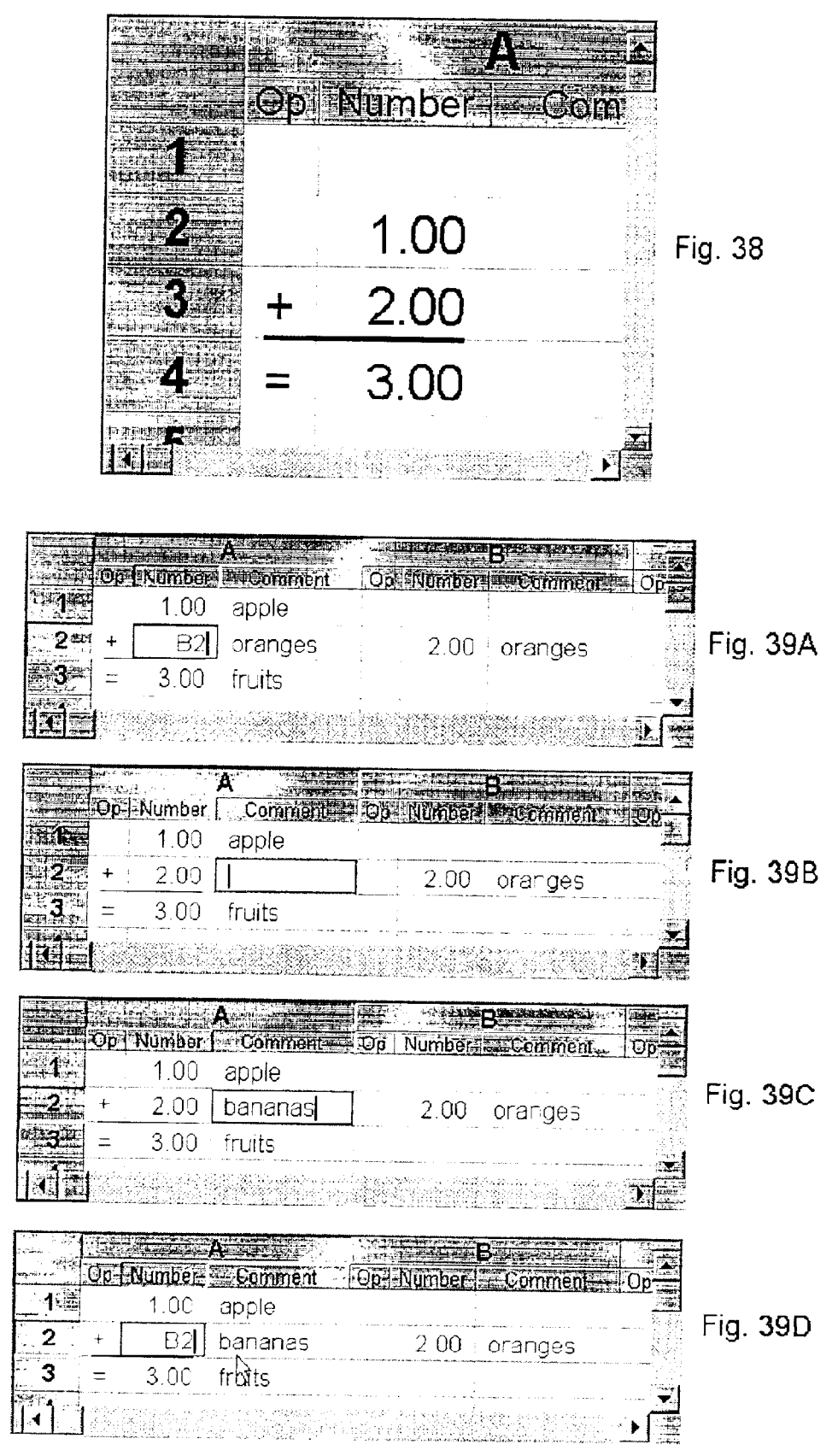

A calcsheet may draw a horizontal line above the character strings of the number and operation fields of total calc lines. This horizontal line is known as an equals line. Changing the operation from a total operation to some other operation may cause the equals line to be erased. FIG. 35A shows an equals line drawn between line A3 and line A4 because line A4 is a total calc line. FIG. 35B shows that, in one embodiment, the equals line is erased when the operation is changed to addition. The thickness of the equals line will be proportional to the font that is used to display the number field of the total calc line. FIG. 36 shows how the equals line increases in thickness when a larger, thicker font is used. The equals line may be drawn anywhere in between the character strings of the operation and number fields of the total calc line and the character strings of the operation and number fields of the line before the total calc line. FIG. 36 shows an equals line that is drawn partly in line A4 and partly in line A3. Drawing the equals line in the line before the total calc line, closer to that line's operation and number field strings, provides an aesthetically pleasing vertical spacing, as shown in FIG. 37. Increasing the height of a total calc line to accommodate the equals line also provides an aesthetically pleasing vertical spacing. FIG. 38 shows a total calc line, line A4, that is several pixels taller than the other lines which do not have total operations. It is not believed that any calculator program or spreadsheet draws an equals line for a total operation.

Horizontal Calculations

In one embodiment, a calcsheet may permit "horizontal calculations" in a field such as a number field. A horizontal calculation may include a formula (e.g., a sequence of values and operators, possibly including functions and/or references, or any other sequence that can be evaluated) entered into a field. The formula and its result may be displayed, for example, when the entry in the field is not being edited. In one embodiment, the user may indicate that the result is to be calculated and displayed by entering an equality character (or other suitable indicator) such as an equals-sign ("=") after the formula. This equality character may be displayed between the formula and the result. For example, if a number field contains the string "1+2*3=", then when it is not being edited, "1+2*3=7" may be displayed in the field. In an example shown in FIG. 45, if a user enters the formula "3+cos(25)" and then an equality character, the calcsheet may display the formula and its result "3.91" when the field containing the formula is not being edited. The horizontal calculation functionality may make a calcsheet significantly more versatile than any existing calculator or spreadsheet.

Vertical Parentheses

A powerful feature of one embodiment of the calcsheet that is not believed to be found in any spreadsheet or calculator program is the ability to modify the order of evaluation of a vertical calculation with parentheses. An opening parenthesis in one line of a vertical calculation and a corresponding closing parenthesis in a subsequent line of the calculation are referred to as vertical parentheses. The parentheses may be entered into the character strings of fields of lines in the vertical calculation. Lines inside vertical parentheses are evaluated first. If there are multiple levels of vertical parentheses (nested parentheses) then lines will be evaluated in the order of innermost to outermost parentheses.

Vertical parentheses may be used in combination with either sequential or algebraic evaluation. The calculation in column B of FIG. 14 shows how the sequential order of evaluation of the calculation in column A can be changed with vertical parentheses. First, the lines in the vertical parentheses are evaluated: 4 is added to 5 producing a result of 9, which is then multiplied by 6 to produce a value of 54 for the lines in the parentheses. This value is then added to 3 to produce a final value of 57 for the vertical calculation. The lines inside vertical parentheses are evaluated in sequential order, as are any lines that are not in vertical parentheses. Sequential order of evaluation modified by vertical parentheses is referred to as sequential-parenthetical order of evaluation.

The calculation in column B in FIG. 15 shows algebraic order of evaluation modified by vertical parentheses, which may be referred to as algebraic-parenthetical order of evaluation. First, the lines in the vertical parentheses are evaluated: 5 is multiplied by 6 producing a result of 30, which is then added to 4 to produce a value of 34 for the lines in the parentheses. This value is then multiplied by 3 to produce a final value of 102 for the vertical calculation. The lines inside vertical parentheses are evaluated in algebraic order, as are any lines that are not in vertical parentheses. In the examples in FIG. 14 and FIG. 15, both the opening and closing parentheses are in number fields, but in one embodiment, a vertical calculation may have the opening and closing parentheses in any field (e.g., opening parenthesis in a an operation field and the closing parenthesis in a comment field).

When a vertical parenthesis is in a number field, it may be included in the number field's character string, as shown in FIG. 40A. The vertical parenthesis may also be displayed with the number field's output character string when the number field does not have the focus, as shown in FIG. 40B. This feature may be implemented by making the parenthesis part of the output character string or by drawing the parenthesis separately from the output character string.

Multi-Row Calc Lines

In one embodiment, a way to allow a calc line to have multiple lines of comment text is with multi-row calc lines. A multi-row calc line is a single calc line that occupies several rows within a column; that is, it takes up the space of several contiguous lines within a column. FIG. 30A shows line A2 with a single line of text in its comment field. When text is added to line A2's comment field character string such that another line is required to display the character string, all the lines below line A2 in column A are moved down one line and line A2 is expanded to occupy the space of rows 2 and 3 in column A. The result is shown in FIG. 30B. When more text is added to line A2's comment field string such that yet another line is required to display the character string, the process is repeated and the result is shown in FIG. 30C. Each field of line A2 is now three rows tall. Notice that the calculation in column B is unaffected. Similarly, a calc line will be contracted when the comment field character string is changed such that it requires fewer lines of text. The character string of line A2's number field and operation field are displayed at the top of the number and operation field by default (i.e., without any explicit action required by the user). This is known as aligning the string at the top of the field.

In one embodiment, the evaluation of vertical calculations is unaffected by multi-row lines. For example, the calculation in FIG. 30C is evaluated as if line A2 and line A5 were contiguous. The lines A3 and A4 are not visible and are said to be overlaid by line A2. In one embodiment, overlaid lines are ignored when evaluating vertical calculations. Therefore, the calculation in FIG. 30C may be evaluated as if it includes only lines A2, A5 and A6.

In one embodiment, the expansion of a calc line may be triggered in several ways. If a comment field has fixed width, then as more characters are typed in than can fit in the comment field, the text can "wrap", i.e., require another line to display. The calcsheet may also allow a user to force the comment text to be displayed on more than one line. This may be accomplished by inserting a linefeed and/or carriage return character. In various embodiments, the expansion may occur as soon as a character is typed in that requires another line of text to display the entire comment, or the expansion may not occur until the comment field loses focus, or a line may not be expanded at all until the user enters an explicit command to expand it.

It is not believed that multi-row lines exist in any calculator program or spreadsheet.

Splitting Text

Another feature of one embodiment of the calcsheet is the ability to split text. Line A2 in FIG. 12A has a comment field that has the focus. When the user enters the split command, a new calc line is inserted after the focus line, and the characters after the cursor are removed from line A2's comment field and placed in the new calc line's comment field, as shown in FIG. 12B. It is not believed that this feature can be found in any calculator program or spreadsheet.

Commands

In order to allow a user of an interactive computer program such as a calcsheet to do things like change field display order, hide fields, or split field text, it is recommended that the program provide some means for allowing users to input information to the program to direct it to perform such actions. The term command will be used for information entered by the user which directs a program to perform some action. There are a very large number of user interface techniques for allowing users to enter commands, each of which has a very large number of possible implementations, effectively producing a nearly infinite number of ways that a programmer can allow commands to be entered. The techniques for entering commands are very well known and are easily within the ability of a programmer with ordinary skill. The term command input means is used to describe the mechanism used to allow users to enter commands. Certain calcsheet functions may use at least one command input means, though more than one may be and often is provided.

As an example of some of the more well-known ways to implement a command input means, some techniques that might be used to change the order of fields within a column are listed below. This is not intended to limit the scope of this invention to command input means that use these techniques, but only to suggest some techniques and to show just how many techniques there are to input commands.

Display graphical buttons for different field orders. When the user clicks on one of these buttons with a pointing device (e.g. a mouse), change the field display order of the current focus column to the order represented by the button.

Create menu items for different field orders. When the user clicks on one of these menu items with a pointing device or selects one of these menu items with a keyboard, change the field display order of the current focus column to the order represented by the menu item.

Assign different keyboard keys (or combinations of keys) to different field orders. When the user hits one of the assigned keys or key combinations, change the field display order of the current focus column to the order assigned to the key or key combination.

Display a text entry field into which the user can enter a text command from the keyboard such as "change order C comment operation number" which will change the order of fields in column C. Process the command when the user hits a reserved key/combination (such as the enter key) or clicks on a button with a pointing device. Note that there are literally an infinite number of possible formats for a text command.

Allow the user to drag a field header to a new position within a column using a pointing device, e.g., drag the comment field header to the left side of the operation field header in order to put the comment field on the left side of the column.

Some other common user interface "gadgets" that can be used for entering commands include lists, drop down lists, sliders, dials, radio buttons, checkboxes, etc. In addition to or instead of a pointing device and a keyboard, a speech recognition system may be used to input commands. The above command entry techniques may be placed on the same window as the rows and columns of the calcsheet, or placed in a separate window that pops up just for entering a command (e.g., a dialog window), or spread across a sequence of separate windows (e.g., a "wizard"). The above techniques may be combined with each other in numerous permutations. Multiple means may be provided for entering the same command. Each of these many user interface techniques may be coded in any number of ways at the discretion of the programmer. Despite the massive number of options for entering commands, implementing any of them is easily within the ability of a programmer with ordinary skill.

Field Order

In one embodiment, all calc lines in a column have their fields displayed in the same order, known as the field display order of the column. For example, a typical field display order for a column is: the operation field on the left, number field to the right of the operation field, and comment field to the right of the number field. In one embodiment, all calc line fields of the same type within a column have the same width.

Figures 25, 26A, 26B, 26C, 26D:
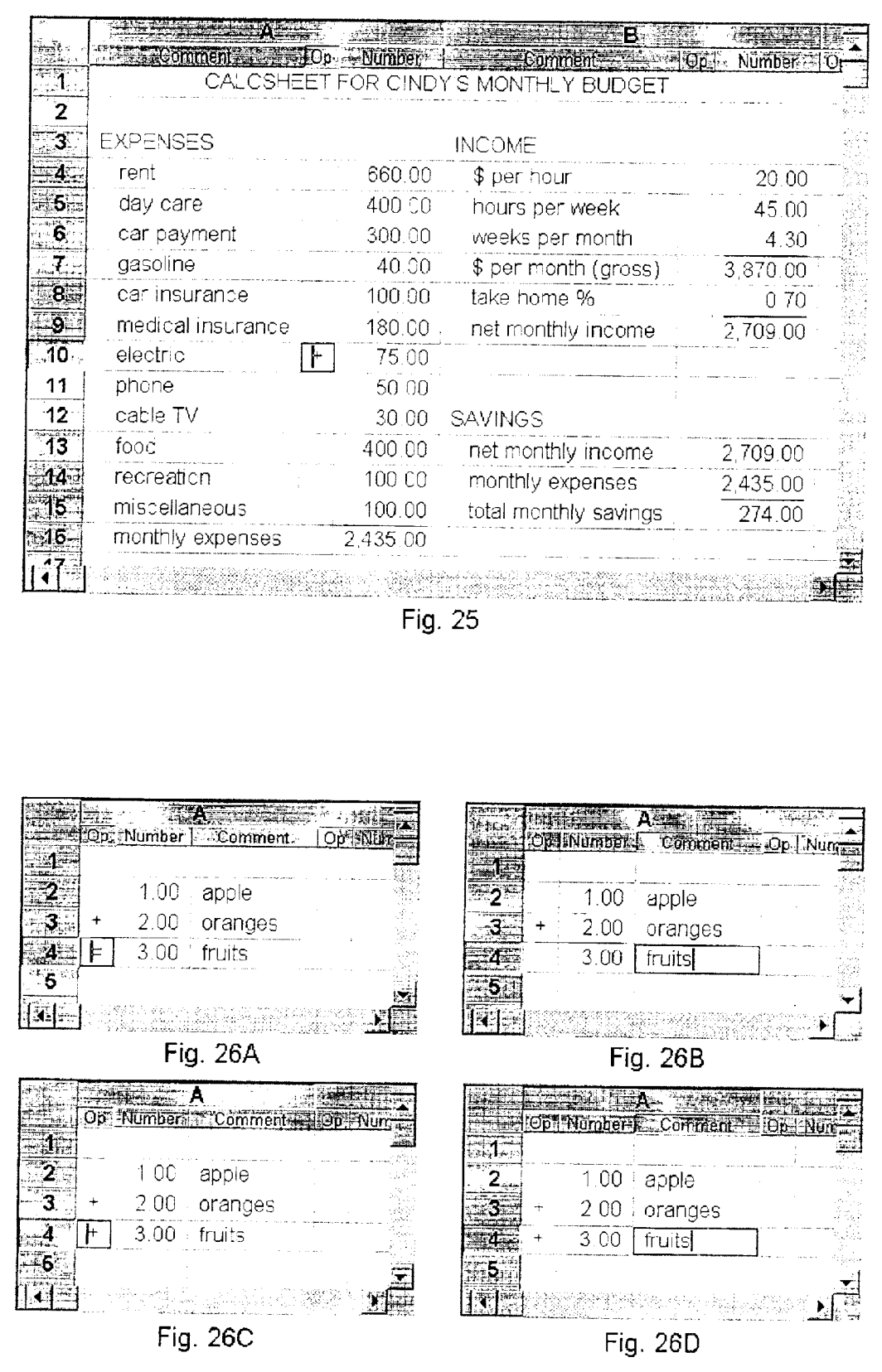

In one embodiment, a column's field display order may be changed. FIG. 25 shows a calcsheet with the comments displayed to the left of the operation and number fields. This format of calculations, with comments on the left side of numbers, is commonly used for business financial documents. As another example, many adding machine tapes print the operation character on the right of the number as shown in FIG. 41. The ability to change the order of fields within a column allows vertical calculations to be displayed in these formats. It is not believed that any calculator programs or spreadsheets allow the order of fields within a column to be changed. In one embodiment, it is recommended that the calcsheet program provide a command to allow the user to change the field display order of a column. See the discussion of commands above for more on commands.

Field Hiding

The ability to change which fields are displayed within a column is a unique feature of the calcsheet. In other words, fields within a column may be "hidden" and "unbidden". Each column has a list of those field types that will be displayed within the column, known as the field display list. Only those fields whose type is in a column's field display list will be displayed. FIG. 5 shows a calcsheet with the comment fields hidden in columns A, B, C and D, allowing many more calculations to be displayed on a single screen. FIG. 6 shows a calcsheet that has the operation and comment fields hidden in columns B, C, D, E and F, allowing the number fields in those columns to appear like cells in a spreadsheet and contain tabular data, while column A contains a vertical calculation. It is not believed that any calculator program or spreadsheet has the ability to specify which fields in a column will be displayed. Note that the term list is a logical term and does not imply that the field display list will be stored physically as a list of any kind. In one embodiment, it is recommended that the calcsheet provide a command to allow the user to specify the fields that will be displayed in a column.

Source String Display

Figures 33A, 33B, 33C, 33D, 34:
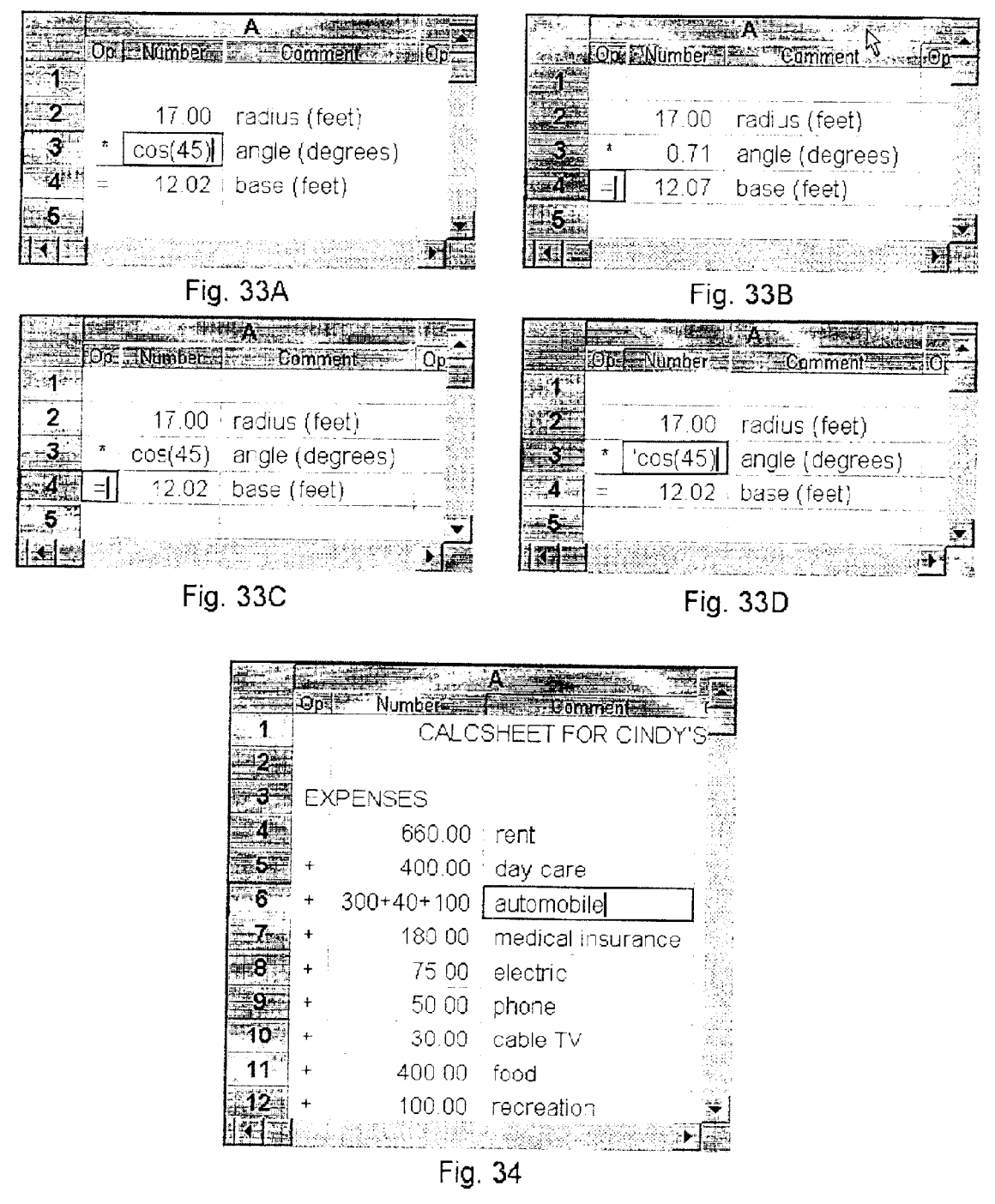

In one embodiment, a number field normally has its output character string, which is the numeric value of the number field's character string, displayed in it when it does not have the focus. It is sometimes desirable to display the number field's character string, also known as its source character string, when it does not have the focus. FIG. 33A shows a calculation with a function, cos(45), in the number field of line A3 while it has the focus. FIG. 33B shows the number field with its output character string displayed in it when it does not have the focus. FIG. 33C shows the number field of line A3 with its source character string displayed in it when it does not have the focus. This feature makes the calculation much more descriptive. FIG. 9A shows a formula in the number field of line A6 while it has the focus. FIG. 9B shows the number field of line A6 with the output character string "440.00" displayed in it when the field does not have the focus. FIG. 34 shows the same calculation with the source character string of line A6's number field displayed when it does not have the focus. This effectively combines a calculation that is displayed horizontally, "300+40+100", with a vertical calculation, which can make a vertical calculation significantly more descriptive to look at. It is not believed that any calculator programs allow the source character string of a calc line's number field to be displayed instead of the output character string. Spreadsheets cells do have the ability to display a cell's source string when the cell is not being edited, but spreadsheets do not have vertical calculations.

In one embodiment, in order to display the character string when the number field does not have the focus, it is recommended that the number field have an indicator that determines whether the character string (i.e. source string) or the output string is displayed when the number field does not have the focus. This indicator may be implemented any number of ways, including as a character that the user places in the character string itself. For example, FIG. 33D shows the character string of line A3's number field with a single quote at the start of the string. In this scheme, the presence of a single quote at the beginning of the character string indicates that the character string should be displayed (minus the single quote) when the number field does not have the focus, and the lack of a single quote at the start of the number field indicates that the output character string should be displayed when the number field does not have the focus. Note that any character and any position could be used; a single quote at the start of the character string is just an example. The indicator may also be an internal data structure that is set by the user entering a particular command.

Copying Referenced Comments

In one embodiment, when a line's number field contains a reference to another calc line, and the referencing line's comment field string is empty, then the referencing line's comment field will have the referenced line's comment field string displayed in it when it does not have the focus. If the referencing line's comment field string is not empty, then it will be displayed in the referencing line's comment field when it does not have the focus. FIG. 39A show line A2 with a reference to line B2 and with its comment field string copied from line B2 because A2's comment string is empty as shown in FIG. 39B. When line A2's comment field has text put in it, FIG. 39C, the comment from line B2 is not copied, as shown in FIG. 39D.

Spreadsheet Lines

Another type of line in one embodiment of a calcsheet is known as a spreadsheet line. A spreadsheet line includes a single field whose string may represent a numeric value or may be descriptive text. Like the number field of a calc line, a spreadsheet line's string may be contain a literal number, a reference, a function invocation, or a formula, any of which will be interpreted as a numeric value. If a spreadsheet line's string is a valid number, reference, function, or formula, then it will be treated as a numeric value; otherwise, it will be treated as descriptive text. In one embodiment, a spreadsheet line occupies at least the entire width of the column that it is in, and it may extend into other columns if it contains descriptive text. FIG. 7 shows a calcsheet with spreadsheet lines containing descriptive text in lines A1, A3, B3 and B12. FIG. 8 shows a calcsheet with spreadsheet lines containing numeric values in lines A7 through D10, while all the other lines are calc lines. The ability to combine spreadsheet lines with calc lines in the same document is a powerful feature that is not believed to be found in any spreadsheet or calculator program. This combination is useful for making a calcsheet easy to use and powerful at the same time.

Field String Display Suppression

In one embodiment, a calcsheet can suppress the display of a field's string when the field does not have the focus. This may be particularly useful for operation fields. FIG. 25 shows a calcsheet where the operation field in lines A5 through A16, B5 through B9, B14 and B15 have non-null strings which are not displayed when those operation fields do not have the focus. When one of these operation fields does have the focus, its string is displayed, as shown in line A10. This format of calculations, with numbers and comments but no operations, is commonly used for business financial documents. The ability to suppress the display of field strings allows calculations to be entered in the familiar calculator style and then displayed in this popular format. It is not believed that any calculator programs or spreadsheets have this ability.

In one embodiment, a calcsheet can also suppress the display of the total operation string in a total calc line's operation field when it does not have the focus, while other operation field strings are not suppressed. Line A4 in FIG. 26A has an operation field with a total operation string, "=" that is visible when the operation field is being edited. FIG. 26B shows that the "=" is not visible when the operation field is not being edited. In FIG. 26C line A4 has had its operation string changed to "+" which is visible when the operation field is being edited, and is also visible when it is not being edited as in FIG. 26D. In one embodiment, the operation field string is only suppressed if it is "=". This feature is quite useful because people do not put an "=" character next to a total when they write vertical arithmetic calculations on paper, and thus they don't expect to see it in a calcsheet. It is not believed that any calculator programs or spreadsheets have this ability.

Horizontal Resizing

Figure 27A:
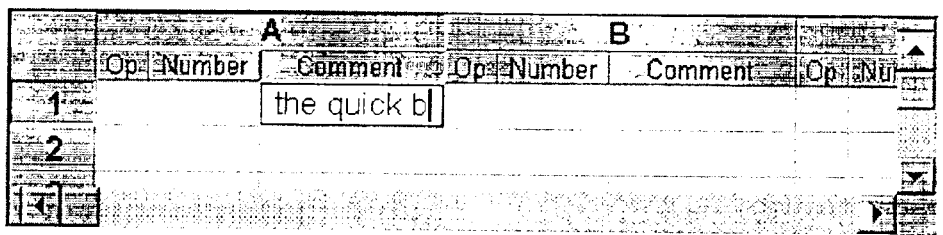
FIGS. 27A, 27B and 27C show automatic resizing of a field and column as characters are typed in according to one embodiment.
Figure 27B:
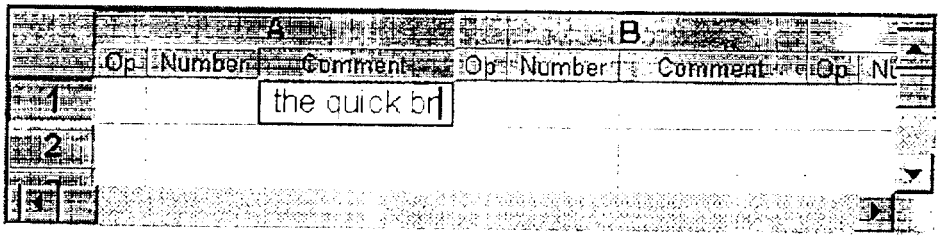
Figure 27C:
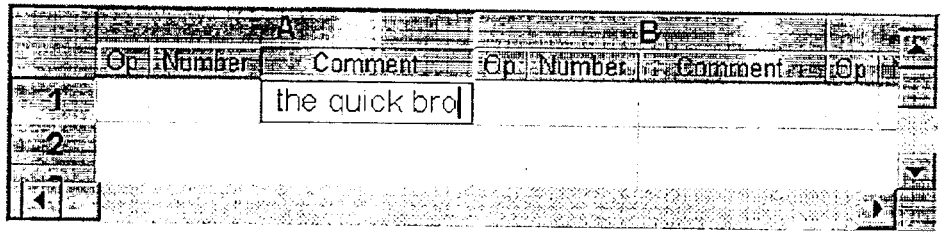

One embodiment of the calcsheet includes the ability to automatically resize fields and columns as the calcsheet program receives input characters. FIG. 27A shows a screen before the character "r" is input, FIG. 27B after "r" has been input, and FIG. 27C after the character "o" has been input. As each character is entered, line A1's comment field is enlarged enough to fit the letter, column A is enlarged enough to fit line A1's comment field, and columns to the right of column A are shifted to the right on the screen. This feature makes it much easier to keep calculations in multiple columns properly spaced, eliminating the need to manually resize columns after entering data. It is not believed that any calculator program or spreadsheet has this ability.

In one embodiment, a field or column can also be made to have fixed width, in which case the field's string will not all be displayed if it exceeds the width of the field.

Single Key Edit Navigation

In one embodiment, calcsheet users are provided the ability to switch from editing one field to editing an adjacent field with a single character (e.g., a single keystroke when the character input means is a keyboard). When editing a field and entering an up arrow character (e.g., depressing the up arrow key on a keyboard), the calcsheet program may set the focus to the field above the field that was being edited. Likewise, inputting a down arrow character key may set the focus to the field below the focus field, a right tab character may set the focus to the next field to the right, and a left tab character may switch focus to the field to the left of the focus field. When the focus is at the start of a field, inputting a left arrow character may set the focus to the field to the left of the focus field in one embodiment. When the focus is at the end of a field, hitting the right arrow key may switch focus to the field to the right of the focus field. FIG. 17A and FIG. 17B show an example of a calcsheet before and after hitting the right arrow key.

This feature may make it significantly easier to modify a calcsheet than it would be to modify a spreadsheet or a calculator program tape. To discuss this advantage, the rest of this paragraph will assume that the character input means is a keyboard including the following keys: up arrow, down arrow, left arrow, right arrow, enter and F2. With one embodiment of a calcsheet, the user can navigate to any field in a calcsheet using only the arrow keys, which typically are grouped together on a keyboard, and immediately modify a field's text as soon as that field gets the focus. It is not believed that any calculator programs allow focus to be changed to another field with the keyboard at all. With spreadsheets the difference is more subtle but very significant. Spreadsheets often do allow users to change focus from one cell to an adjacent one using the arrow keys, but the contents of the new focus cell are not being edited when it gets the focus. In a spreadsheet, the first character entered will completely replace all text that is already in the cell. Spreadsheets do not allow the user to switch from editing one cell to editing another cell with a single keystroke. In order to edit another cell, the user must typically double-click the cell with the mouse or enter multiple keystrokes. For example, in a typical spreadsheet, if cell A3 is being edited, and the user wants to edit cell B3, then the user may enter the key sequence "enter, right arrow, F2". If the user hits only the right arrow key, the focus will not change to cell B3; instead, the focus will be "stuck" in cell A3. This behavior is a source of significant frustration to many spreadsheet users and is one of the factors that makes spreadsheets so unintuitive and difficult to use for so many people.

Calculator Input Mode

Another capability of one embodiment the calcsheet is known as calculator input mode. This feature may allow calculations to be entered in a calcsheet in a way which is very similar to a hand held calculator. As each character of a calculation is input, the calcsheet program may automatically insert new lines, switch input focus to the appropriate fields, insert the input characters into the appropriate field string, and display the input characters, in order to build a vertical calculations from the input characters. This feature may provide a significant usability advantage over calculator programs because it provides immediate visual feedback as calculations are typed in: lines are inserted as soon as possible and characters are displayed in fields as soon as possible. In calculator programs, a new line is not inserted until the line is completely typed in, and it is often not clear what changes will be made to the tape. Another major advantage is that calculator input mode works while editing a previously entered field. In contrast, calculator programs do not allow new vertical calculations to be entered while editing a previously entered field.

The behavior of one embodiment of the calcsheet program in calculator input mode is further described as follows. In one embodiment, when an operation character is input, the calcsheet program will insert a new line after the focus line, place the input operation character into the operation field of the new line, and set the focus to a field in the new calc line, preferably the number field since a numeric character is most likely to be entered next. A variation of this is when the focus field is an operation field with an empty character string. In this case, instead of inserting a new calc line, the input operation character may be placed directly into the focus field. When a numeric character is input and the focus is on an operation field, the calcsheet program may insert a new calc line after the focus line, place the input character into the number field of the new line, and set the focus to a field in the new line (preferably the number field since a numeric character is most likely to be entered next). A variation of this may occur when the number field of the focus line is empty: instead of inserting a new calc line, the input character may be placed into the number field. When a text character is input that is not numeric and is not an operation, and the focus is on an operation or number field, the calcsheet program may place the input character into the comment field of the focus line and set the focus to the comment field.

Figures 16A, 16B, 16C, 16D, 16E, 16F, 16G:
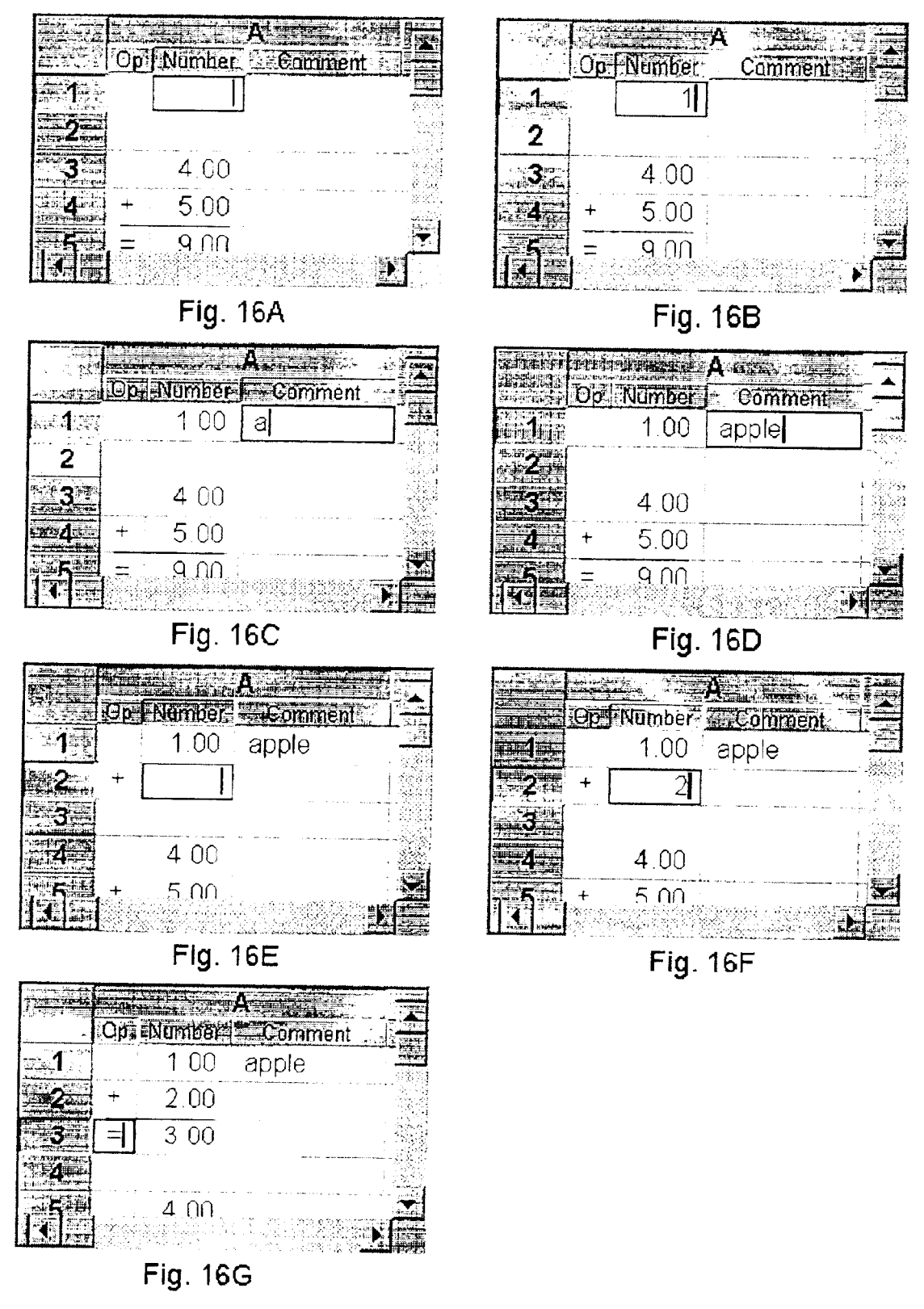

FIGS. 16A through 16G further illustrate the behavior of one embodiment of the calcsheet program in calculator input mode. FIGS. 16A through 16G show a screen sequence produced by typing in the character sequence "1apple+2=" in calculator input mode. FIG. 16A shows the screen before any characters are entered and when the focus is in line A1's number field FIG. 16B shows the screen when "1" is entered; it is placed in the number field because it is a numeric character. The focus remains in the number field. FIG. 16C shows that when "a" is entered, it is sent to the comment field because it is not a numeric character and not an operation character. The focus is set to the comment field. As shown in FIG. 16D, the characters "pple" are not numeric and not operation characters, so as they are entered, they are each placed into the comment field, where the focus stays. In FIG. 16E, when the "+" character is entered, since it is an operation, a new line is inserted after line A1, the "+" is placed in the operation field of the new line, and the focus is set to the new line's number field. As shown in FIG. 16F, when the "2" is entered it is placed in line A2's number field since it is a numeric character, and the focus stays there. As shown in FIG. 16G, when the "=" is entered, since it is an operation character, a new line is inserted after line A2, the "=" is placed in the operation field of the new line, and the focus is set to the new line's operation field. The "=" operation causes the value of the calculation, 3, to be displayed in the line's number field.

In one embodiment, a useful variation of calculator input mode is calculator input "overlay mode" where vertical calculations overlay existing lines as they are input. In this variation, the behavior of the calcsheet program is substantially the same as described above for calculator input mode, except that instead of inserting a new calc line and placing the input character into the new line, the input character is placed into the next line in the column, overlaying any existing data in the line. FIGS. 29A through 29E show a sample screen sequence in which the character sequence "1+2=" is entered. Notice that when the "+" and the "=" were entered, no new lines were inserted, and the "3.00" overlaid the "4.00" in line A3. It is not believed that this feature can be found in any calculator program; all existing calculator programs insert new lines as calculations are entered. Spreadsheets, of course, do not support vertical calculations at all.

Field Fonts

In one embodiment, a calcsheet has a default font which may be used to display all character strings in all fields. A calc line can have a font assigned to individual fields. In one embodiment, when a field of a calc line has a font assigned to it, then that field's character string will be displayed using that font, as will the field's output string if it is a number or comment field. If a field does not have a font assigned to it, then its font is said to be null and the default font for the calcsheet may be used to display any strings in the field. FIG. 31 shows a calcsheet with particular fields of calc lines that have been assigned fonts. Line A11's number field has a bold italic font, line A16's comment field has an italic font, as do the comment fields of lines B9 and B15. As shown in the example, all other fields of the calc lines in FIG. 31 use the default font for the calcsheet. It is not believed that any existing calculator programs allow individual fonts to be assigned to fields, and no spreadsheets have multiple fields within a cell. The ability to change fonts of individual fields is desirable to enable a single program to allow calculations to be entered in the familiar calculator input format and also to produce professional quality business documents. It is not believed that any calculator programs have this ability. Spreadsheet cells can often have fonts assigned to them, but spreadsheets do not provide vertical calculations or fields within a cell.

Field String Alignment

In one embodiment, the alignment of a character string within a field may be changed. Alignment refers to whether the text is drawn on the right side, left side, or in the center of, a field. Each field may have an indicator that determines how the text within the field will be aligned. FIG. 32 shows a calcsheet with comment fields whose text is right aligned. It is not believed that any existing calculator programs allow individual fields to have their alignment changed, and no spreadsheets have multiple fields within a cell. The ability to change the alignment of individual fields is desirable to enable a single program to allow calculations to be entered in the familiar calculator input format and also to produce professional quality business documents. It is not believed that any calculator programs have this ability. Spreadsheet cells can have their text aligned, but spreadsheets do not provide vertical calculations or fields within a cell.

Calcsheet Program

The calcsheet functionality discussed herein may be implemented by a calcsheet program which is a sequence or group of sequences of instructions that configure a general purpose microprocessor to perform at least the following tasks, among others:

1. process characters that are input by the user;
2. provide a command input means and process commands that are input by the user; and
3. display any visual element of the calcsheet such as rows, colunms, lines, fields, strings, headers, focus indicators, etc. that are desired to be displayed.

The calcsheet program need not necessarily be implemented as a single contiguous section of code, i.e., as a single function or subroutine or method. While a calcsheet program may be implemented as a single subroutine, or as a single object, or as a single method of an object, more typically it will be implemented across multiple subroutines and/or across multiple objects and/or multiple methods. Different parts of it may be implemented in different programming languages. Sections of the program may be stored as separate files which are loaded and executed when they are needed. Techniques for implementing the functions described in this specification are very well known and are well within the ability of a programmer of ordinary skill.

Alternative Embodiments

Multiple Cells Instead of Multiple Fields

In another embodiment, much of the functionality described herein may be provided by using the cells of a spreadsheet-like document rather than the multi-field columns described in detail above. For example, the operation field, number field, and optional comment field may be implemented using separate columns as in a traditional spreadsheet approach. Nevertheless, as noted elsewhere in this specification, calcsheet functionality is not provided by traditional spreadsheets.

No Comment Field

In a preferred embodiment, calc lines contain a comment field used for holding descriptive commentary. Nevertheless, a comment field is not necessary for most of the functionality of a calcsheet.

Spreadsheet Lines

The combination of spreadsheet lines with calc lines may greatly enhance the functionality of a calcsheet. A useful variation of this is to provide a single-field line that is like a spreadsheet line except that it can only hold descriptive comments (i.e., the contents of the line are not evaluated to produce a numeric value for the line). This provides the ability to display descriptive comments that span more than one field as in FIG. 7, while still having calc lines' number fields for numerical calculations. The combination of spreadsheet lines with calc lines in the same document can be provided in two basic ways. One way is to put both calc lines and spreadsheet lines in a calcsheet when a new calcsheet is created. The other way is to create a new calcsheet that has either all calc lines or all spreadsheet lines and then allow the user to add the other type of line to the calcsheet.

Output Strings

As discussed above, the preferred embodiment includes a separate output string which contains the numeric value of a number field. However, another useful embodiment could simply display a number field's character string in the number field when it does not have the focus. In other words, the number field's output string is the same as its character string in this embodiment. If number fields do not have output character strings that are different from their character strings, then a technique for formatting numbers is to modify the character string of the number field when it loses the focus. For example, if a user enters "1234" into a number field's character string, then when that number field loses focus, the calcsheet would modify the field's character string in accordance with a user-specified format, for example "1,234.00", which is displayed in the field. When the user edits that number field again, the character string "1,234.00" will be displayed instead of "1234". This formatting technique is used in several existing calculator programs.

Commands vs. Character Input

The difference between a command and character input is largely a semantic one. For example, this specification elsewhere describes clicking on a button of a graphical calculator as a form of character input (i.e., clicking on a button with a "9" on it is inputting the character "9"). However, one could just as easily describe clicking on a button with a "9" on it as entering a command to enter the character "9".

Calculator Input Mode

Throughout this specification, calculator input is described in terms of which field has the focus when a character is input and which field will receive the focus after the input character is processed. In a preferred embodiment, visual indicators of focus are displayed. For example, a box may be drawn around the focus field, a cursor may be drawn at the focus character, and the row, column, and field headers for the focus field may be visually differentiated. However, a useful variation of calculator input mode in one embodiment is to not display these visual focus indicators, but continue to insert new lines as needed, insert input characters into appropriate fields' character strings, and display input characters, as each input character is entered. Though the focus indicators are not drawn, this technique may still give the user immediate visual feedback by immediately inserting new lines and displaying input characters in the appropriate field.

Order of Evaluation

Figure 2:
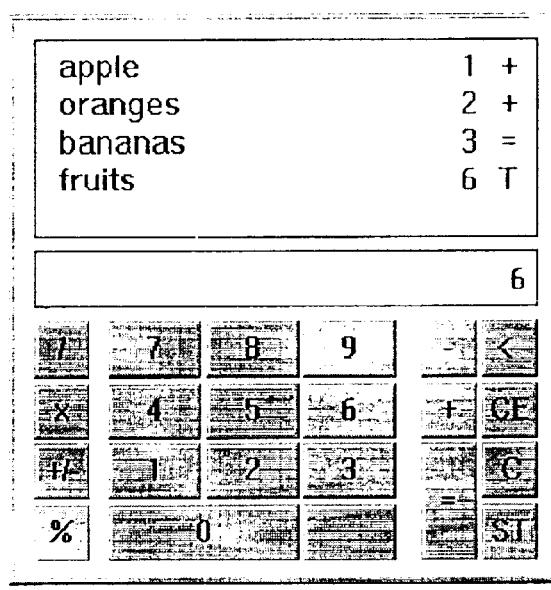
FIG. 2 shows another example of a calculator program with a modifiable tape.

In one embodiment, a simple variation of the sequential and algebraic orders of evaluation is to have the operation in the same calc line as the first operand of an operation, instead of in the same calc line as the second operand. This is equivalent to taking a regular sequential or arithmetic calculation and moving each operation up one line. Thus the calculation "1+2*3=" would be entered as shown in column B of FIG. 42, as compared to the regular sequential order shown in column A. The order that the operations are applied to the numbers is identical for both calculations. In this example the "=" is placed in line B3, while the calculation value, 7, is placed in the number field of line B4, and a "T" is placed in the operation field of line B4, a scheme that is used in an actual calculator program as shown in FIG. 2. Many other variations of this scheme are possible, such as placing the "=" in line B4, placing some operation string other than "T" or "=" in line B4, placing some operation string other than "=" in line B3, leaving the operation field of line B3 or B4 blank, etc.

Vertical Calculation Bounds

In various embodiments, variations on vertical calculations may involve determining the end of one calculation and the start of the next one in a column in various ways. For example, some calculator programs have special lines which cannot contain any data and serve only to separate one vertical calculation from the next. Some calculator programs allow null calc lines to be in a vertical calculation, and some interpret a null line as the start or end of a calculation.

Other Input Means

The character input means described, a keyboard and a graphical calculator with a pointing device, are used in various embodiments. However, other means are certainly possible for entering characters. For example, speech recognition technology is improving rapidly, and it is possible to create a system that uses speech recognition to enter calculations. For example, the words "one apple plus two oranges equals fruits" could be translated into the character sequence "1apple+2oranges=fruits" which would result in the calculation in FIG. 23. Another possible input means includes a program interface that would allow other computer programs to send character input to a calcsheet, perhaps from a program that is running on another computer on a network.

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as networks 102 and 104 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:

entering one or more mathematical operators;

entering a plurality of numeric values;

displaying the mathematical operators in one or more operation fields in columnar format down at least one of a plurality of rows in a first column on a display screen;

displaying the numeric values in a plurality of number fields in columnar format down the plurality of rows on the display screen and alongside the one or more operation fields in the first column;

entering an open parenthesis character in an upper row in the first column;

entering a close parenthesis character in a lower row in the first column, wherein the lower row is displayed below the upper row on the display screen;

automatically calculating a result by applying the set of mathematical operators to the set of numeric values and by following an order of evaluation which respects the open and close parentheses;

displaying the result on the display screen.

2. The method of claim 1, wherein the entering the open parenthesis character in the upper row comprises entering the open parenthesis character in one of the number fields in the upper row.

3. The method of claim 1, wherein the entering the close parenthesis character in the lower row comprises entering the close parenthesis character in one of the number fields in the lower row.

4. The method of claim 1, wherein the entering the open parenthesis character in the upper row comprises entering the open parenthesis character in one of the operation fields in the upper row.

5. The method of claim 1, wherein the entering the close parenthesis character in the lower row comprises entering the close parenthesis character in one of the operation fields in the lower row.

6. The method of claim 1, further comprising:

entering one or more comment strings; and displaying the comment strings in one or more comment fields in columnar format down the at least one of the plurality of rows on the display screen.

7. The method of claim 6, wherein the entering the open parenthesis character in the upper row comprises entering the open parenthesis character in one of the comment fields in the upper row.

8. The method of claim 6, wherein the entering the close parenthesis character in the lower row comprises entering the close parenthesis character in one of the comment fields in the lower row.

9. The method of claim 1, further comprising:

displaying a single column label for the first column, wherein the single column label spans the width of one of the operation fields and one of the number fields.

10. The method of claim 1,
wherein the operation fields and number fields are comprised in a plurality of columns.

11. A system comprising:

a CPU;

a display screen coupled to the CPU;

a memory coupled to the CPU, wherein the memory stores program instructions which are executable by the CPU to:

receive into the memory one or more mathematical operators;

receive into the memory a plurality of numeric values;

display the mathematical operators in one or more operation fields in columnar format down at least one of a plurality of rows in a first column on the display screen;

display the numeric values in a plurality of number fields in columnar format down the plurality of rows on the display screen and alongside the one or more operation fields in the first column;

receive into the memory an open parenthesis character in an upper row in the first column;

receive into the memory a close parenthesis character in a lower row in the first column, wherein the lower row is displayed below the upper row on the display screen;

automatically calculate a result by applying the set of mathematical operators to the set of numeric values and by following an order of evaluation which respects the open and close parentheses;

display the result on the display screen.

12. The system of claim 11,
wherein the receiving into the memory the open parenthesis character in the upper row comprises receiving into the memory the open parenthesis character in one of the number fields in the upper row.

13. The system of claim 11,
wherein the receiving into the memory the close parenthesis character in the lower row comprises receiving into the memory the close parenthesis character in one of the number fields in the lower row.

14. The system of claim 11,
wherein the receiving into the memory the open parenthesis character in the upper row comprises receiving into the memory the open parenthesis character in one of the operation fields in the upper row.

15. The system of claim 11,
wherein the receiving into the memory the close parenthesis character in the lower row comprises receiving into the memory the close parenthesis character in one of the operation fields in the lower row.

16. The system of claim 11, wherein the program instructions are further executable by the CPU to:

receive into the memory one or more comment strings; and display the comment strings in one or more comment fields in columnar format down the at least one of the plurality of rows on the display screen.

17. The system of claim 16,
wherein the receiving into the memory the open parenthesis character in the upper row comprises receiving into the memory the open parenthesis character in one of the comment fields in the upper row.

18. The system of claim 16,
wherein the receiving into the memory the close parenthesis character in the lower row comprises receiving into the memory the close parenthesis character in one of the comment fields in the lower row.

19. The system of claim 11,
wherein the program instructions are further executable by the CPU to:

display a single column label for the first column, wherein the single column label spans the width of one of the operation fields and one of the number fields.

20. The system of claim 11,
wherein the operation fields and number fields are comprised in a plurality of columns.

21. A computer storage medium comprising program instructions, wherein the program instructions are executable by a computer to implement:

receiving into a memory one or more mathematical operators;

receiving into the memory a plurality of numeric values;

displaying the mathematical operators in one or more operation fields in columnar format down at least one of a plurality of rows in a first column on a display screen;

displaying the numeric values in a plurality of number fields in columnar format down the plurality of rows on the display screen and alongside the one or more operation fields in the first column;

receiving into the memory an open parenthesis character in an upper row in the first column;

receiving into the memory a close parenthesis character in a lower row in the first column, wherein the lower row is displayed below the upper row on the display screen;

automatically calculating a result by applying the set of mathematical operators to the set of numeric values and by following an order of evaluation which respects the open and close parentheses;

displaying the result on the display screen.

22. A computer storage medium of claim 21,
wherein the receiving into the memory the open parenthesis character in the upper row comprises receiving into the memory the open parenthesis character in one of the number fields in the upper row.

23. A computer storage medium of claim 21,
wherein the receiving into the memory the close parenthesis character in the lower row comprises receiving into the memory the close parenthesis character in one of the number fields in the lower row.

24. A computer storage medium of claim 21,
wherein the receiving into the memory the open parenthesis character in the upper row comprises receiving into the memory the open parenthesis character in one of the operation fields in the upper row.

25. A computer storage medium of claim 21,
wherein the receiving into the memory the close parenthesis character in the lower row comprises receiving into the memory the close parenthesis character in one of the operation fields in the lower row.

26. A computer storage medium of claim 21, wherein the program instructions are further executable by the computer to implement:

receiving into the memory one or more comment strings; and displaying the comment strings in one or more comment fields in columnar format down the at least one of the plurality of rows on the display screen.

27. A computer storage medium of claim 26, wherein the receiving into the memory the open parenthesis character in the upper row comprises receiving into the memory the open parenthesis character in one of the comment fields in the upper row.

28. A computer storage medium of claim 26, wherein the receiving into the memory the close parenthesis character in the lower row comprises receiving into the memory the close parenthesis character in one of the comment fields in the lower row.

29. A computer storage medium of claim 21, wherein the program instructions are further executable by the computer to implement:

displaying a single column label for the first column, wherein the single column label spans the width of one of the operation fields and one of the number fields.

30. A computer storage medium of claim 21, wherein the operation fields and number fields are comprised in a plurality of columns.

* * * * *